US011025896B2

(12) United States Patent
Iguchi

(10) Patent No.: US 11,025,896 B2
(45) Date of Patent: Jun. 1, 2021

(54) THREE-DIMENSIONAL DISPLAY

(71) Applicant: SHARP KABUSHIKI KAISHA, Osaka (JP)

(72) Inventor: Katsuji Iguchi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 144 days.

(21) Appl. No.: 16/411,063

(22) Filed: May 13, 2019

(65) Prior Publication Data

US 2019/0356907 A1 Nov. 21, 2019

(30) Foreign Application Priority Data

May 18, 2018 (JP) .............................. JP2018-096497

(51) Int. Cl.
*H04N 13/363* (2018.01)
*G02B 17/00* (2006.01)
*G02B 30/56* (2020.01)

(52) U.S. Cl.
CPC ......... *H04N 13/363* (2018.05); *G02B 17/002* (2013.01); *G02B 30/56* (2020.01)

(58) Field of Classification Search
CPC ..... H04N 13/363; G02B 30/56; G02B 17/002
USPC ....................................................... 359/546
See application file for complete search history.

(56) References Cited

U.S. PATENT DOCUMENTS

| 10,072,815 | B2* | 9/2018 | MacKinnon | ............ | H01S 5/005 |
| 10,536,690 | B2* | 1/2020 | Kaehler | ................ | G02B 30/27 |
| 10,681,328 | B1* | 6/2020 | Shpunt | ................. | G02B 3/0056 |
| 2006/0038879 | A1* | 2/2006 | Kremen | ............... | H04N 13/324 |
| | | | | | 348/51 |
| 2009/0237914 | A1 | 9/2009 | Lai et al. | | |
| 2011/0007277 | A1* | 1/2011 | Solomon | .............. | H04N 13/302 |
| | | | | | 353/7 |
| 2012/0081788 | A1 | 4/2012 | Maekawa et al. | | |
| 2012/0127287 | A1* | 5/2012 | Redmann | ............. | H04N 13/125 |
| | | | | | 348/54 |
| 2012/0127570 | A1 | 5/2012 | Sakai et al. | | |
| 2016/0109652 | A1* | 4/2016 | Schowengerdt | ......... | G02B 6/40 |
| | | | | | 385/24 |
| 2017/0069612 | A1 | 3/2017 | Zhang et al. | | |
| 2017/0357099 | A1* | 12/2017 | Last | ....................... | G09G 3/003 |
| 2020/0259314 | A1* | 8/2020 | Kearns | ................ | H01S 5/32341 |

FOREIGN PATENT DOCUMENTS

| CN | 101546500 A | 9/2009 |
| CN | 102132193 A | 7/2011 |
| JP | 2003-279894 A | 10/2003 |

(Continued)

OTHER PUBLICATIONS

Yasuhiro Takagi, "3D Display Technologies: From Naked Eye to Holography", Yearbook of Display Technologies 2012, Nikkei BP Co. (see the machine-translated English translation).

*Primary Examiner* — Collin X Beatty
(74) *Attorney, Agent, or Firm* — ScienBiziP, P.C.

(57) ABSTRACT

A three-dimensional display includes a plurality of microprojectors, each of which including a display element and a projection optic, and a micro-lens array, and each microprojector projects a display image displayed by the display element onto the micro-lens array through the projection optic and the display element includes a drive circuit substrate and a plurality of micro light emission elements formed on a surface on one side of the drive circuit substrate.

17 Claims, 15 Drawing Sheets

(56) References Cited

FOREIGN PATENT DOCUMENTS

TW 201714012 A 4/2017
WO 2010/131622 A1 11/2010

* cited by examiner

FIG. 3
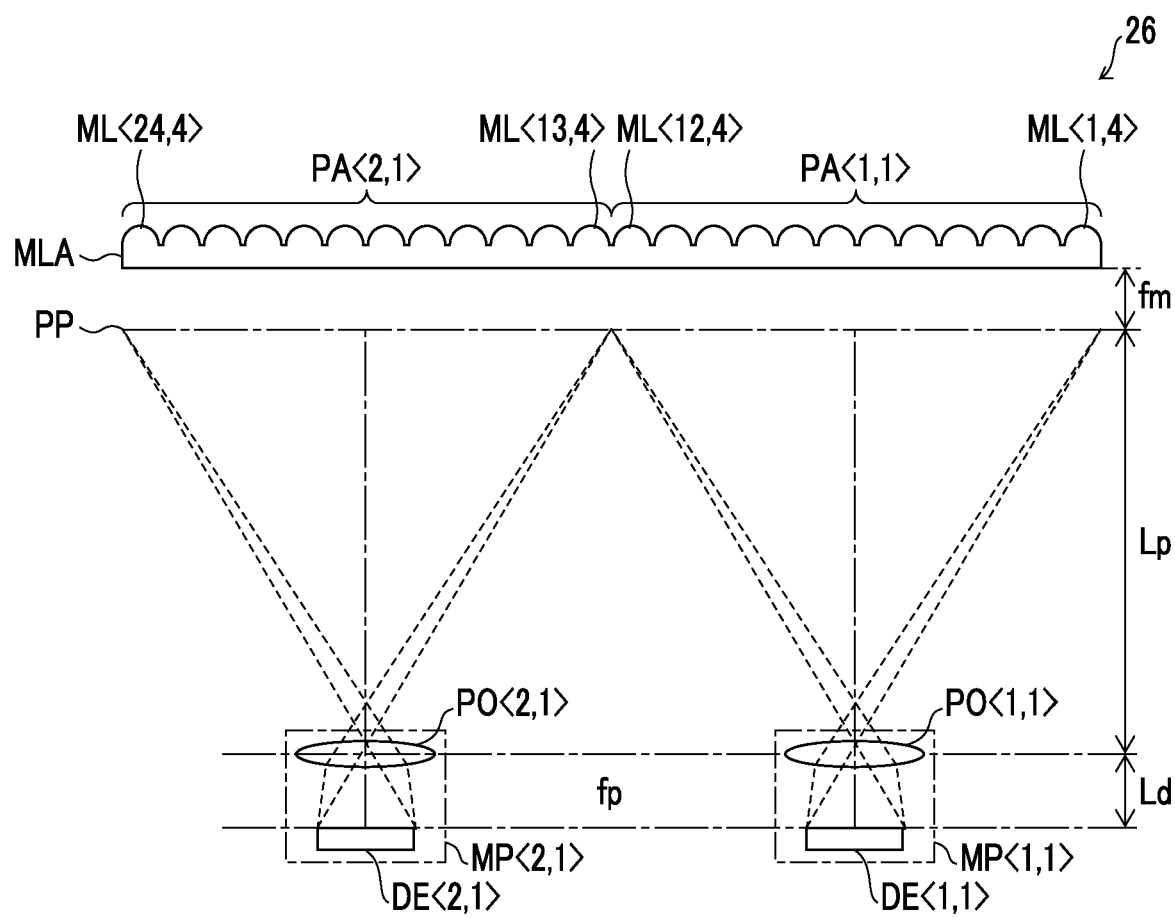
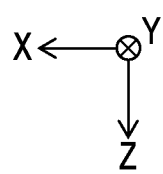

THREE-DIMENSIONAL DISPLAY

BACKGROUND

1. Field

The present disclosure relates to a three-dimensional display that displays a three-dimensional image and a three-dimensional display (also referred to as an aerial three-dimensional display) that displays a three-dimensional image floating in the air.

2. Description of the Related Art

In the related art, as a three-dimensional display technique capable of viewing a three-dimensional image from various angles, for example, an integral imaging technique (also referred to as an integral photography technique) is known. The integral imaging technique has a configuration in which a flat panel display and a lens array is combined and generates horizontal parallax and vertical parallax by deflecting light emitted from each pixel of the flat panel display by a lens (see, for example, Yasuhiro Takaki, "3D display technology: From the naked eye to holography", Display Technology Yearbook 2012, Nikkei Business Publications, Inc.).

A configuration (a multi-projector method) in which a plurality of projectors and a lens array are combined has been proposed (see, for example, Japanese Unexamined Patent Application Publication No. 2003-279394 (published Oct. 2, 2003)) for the purpose of achieving compatibility between three-dimensional quality (3D-quality) and resolution of an image.

In addition, a technique for causing a three-dimensional image to be displayed in the air using a special reflective optical element has been proposed. For example, a technique using a reflective optical element called a dihedral corner reflector array (DCRA) has been disclosed (see, for example, WO2010-131622 (published Nov. 13, 2010)). In this technique, by arranging the DCRA on an object, it is possible to cause the object to be displayed as if the object is floating in the air in an upper space of the DCRA.

However, for example, assuming a situation where a doctor looks at a three-dimensional image of high 3D-quality and high resolution with a full size (actual size) of an organ such as a patient's heart in order to examine surgery, it is demanded to use a small-to-medium-sized flat panel display having a very high resolution (for example, resolution of 4 K×2 K or more) in the conventional integral imaging technique. In a case of a high resolution small-to-medium-sized flat panel display, there is a problem that a size of each pixel becomes small and an image displayed on each pixel becomes dark.

Here, 3D-quality of the three-dimensional image means how many images from different angles can be displayed when displaying the object, and resolution of the three-dimensional image means how finely the object can be displayed.

Further, in the conventional multi-projector method, it is possible to achieve compatibility between high resolution and high luminance, but it is difficult to downsize and it is not suitable for use for looking at a relatively small three-dimensional image as in the case where it is demanded to look at organs such as the heart of the patient as described above at the full size (actual size).

It is desirable to realize a three-dimensional display capable of displaying brightly a three-dimensional image of a relatively small object with high 3D-quality and high resolution.

SUMMARY

According to an aspect of the present disclosure there is provided a three-dimensional display including a plurality of micro-projectors and an optical member, and in which each of the plurality of micro-projectors includes a display element and a projection optic for projecting a display image displayed by the display element toward the optical member, and the display element includes a drive circuit substrate and a plurality of micro light emission elements formed on a surface on one side of the drive circuit substrate.

BRIEF DESCRIPTION OF THE DRAWINGS

FIG. 3 is an enlarged sectional view of the display unit of the three-dimensional display according to Embodiment 1 of the present disclosure;

DESCRIPTION OF THE EMBODIMENTS

Embodiments of the present disclosure are described below with reference to FIGS. 1 to 15. Hereinafter, for convenience of explanation, the same reference symbols may be added to configurations having the same functions as configurations described in a specific embodiment, and the descriptions thereof may be omitted.

Embodiment 1

Hereinafter, Embodiment 1 of the present disclosure will be described based on FIGS. 1 to 7.

Regarding Entire Configuration of Three-Dimensional Display 31

Figure 1:
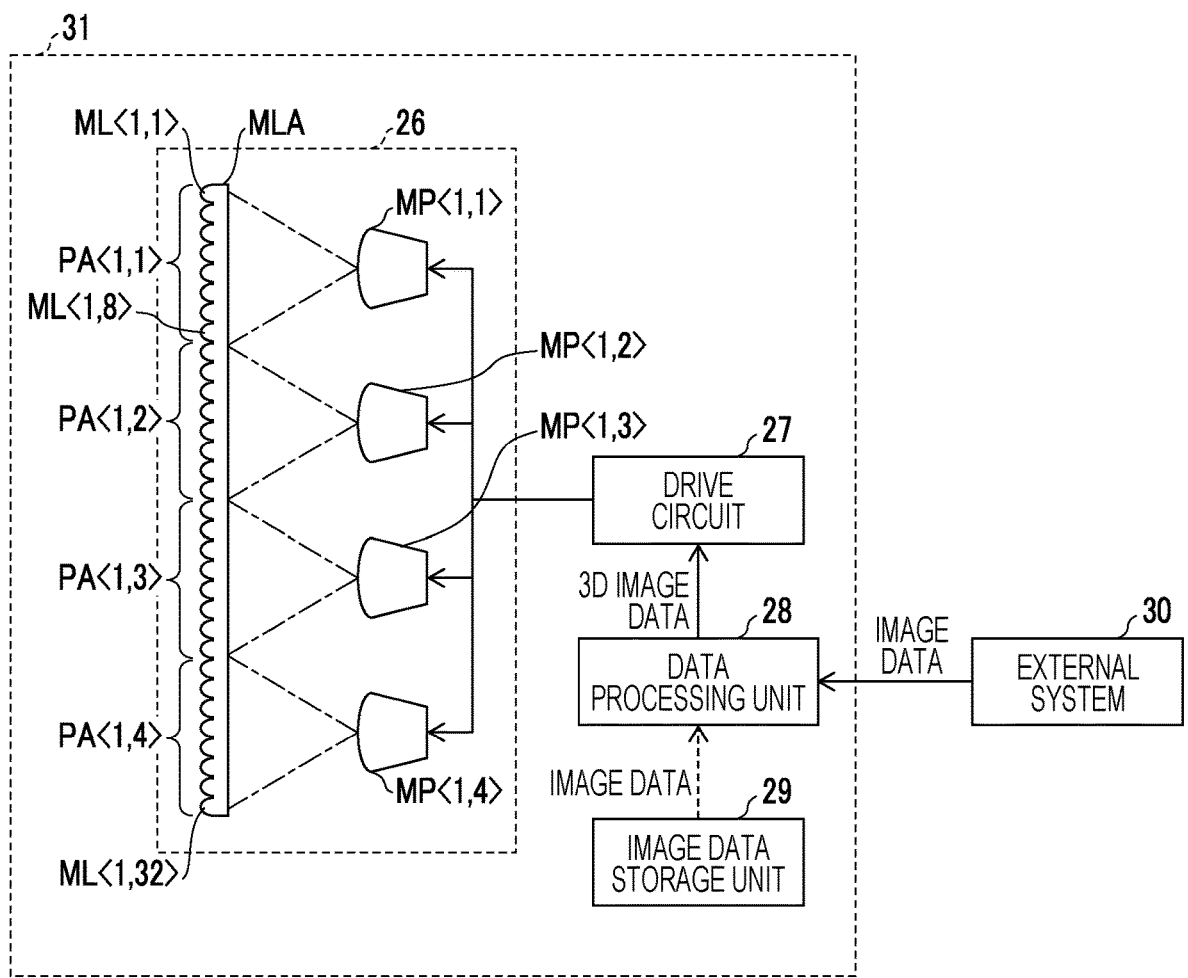
FIG. 1 is a view schematically illustrating an overall configuration of a three-dimensional display according to Embodiment 1 of the present disclosure.

FIG. 1 is a view schematically illustrating an overall configuration of a three-dimensional display 31. As illustrated in FIG. 1, the three-dimensional display 31 includes a display unit 26, a drive circuit 27, a data processing unit 28, and an image data storage unit 29. The image data storage unit 29 may be provided as demanded, and may not be provided in a case where it is not demanded to store image data in the three-dimensional display 31.

The data processing unit 28 acquires image data from an external system 30 such as an image server connected to the data processing unit 28 by wire connection or wireless connection. The data processing unit 28 may be configured to be able to generate image data by computer graphic technology, for example.

In a case where the image data generated by the data processing unit 28 or the image data acquired by the data processing unit 28 from the external system 30 is 3D image data that is image data representing an object from a plurality of different, directions, the data processing unit 28 sends the 3D image data to the drive circuit 27 as it is. On the other hand, in a case where the image data acquired by the data processing unit 28 from the external system 30 is not 3D image data, the data processing unit 28 generates 3D image data based on the acquired image data and sends the 3D image data to the drive circuit 27.

The image data acquired by the data processing unit 23 from the external system 30 may be stored in the image data storage unit 29, and as indicated by the dotted line in FIG. 1, the data processing unit 28 may take out the image data stored in the image data storage unit 29 as demanded.

The drive circuit 27 transmits a light emission amount to each pixel of the display unit 26 based on the 3D image data from the data processing unit 23, thereby driving the display unit 26 to emit light and displaying a three-dimensional image.

Since the drive circuit 27 and the data processing unit 28 can be configured using various known techniques, the display unit 26 will be mainly described in this embodiment.

Regarding Configuration of Display Unit 26

The display unit 26 includes one micro-lens array MLA and a plurality of micro-projectors MP<1, 1> to MP<4, 4> (16 micro-projectors in this embodiment). The notation MP<a, b> (a and b are natural numbers of 1 or more) is a notation for distinguishing a plurality of identical micro-projectors.

In the micro-lens array MLA, micro-lenses ML<1, 1> to ML<48, 32> (1536 micro-lenses in this embodiment) are disposed in a two-dimensional array. The notation ML<i, j> (i and j are natural numbers of 1 or more) is a notation to distinguish a plurality of identical micro-lenses.

In this embodiment, for convenience of explanation, a case where the display unit 26 includes 16 micro-projectors MP<1, 1> to MP<4, 4> and 1536 micro-lenses ML<1, 1> to ML<48, 32> will be described as an example, but is nor limited thereto, and it goes without saying that the number of micro-projectors MP<a, b> and the number of micro-lenses ML<i, j> can be appropriately determined in accordance with the specification of the display unit to be obtained.

A projection area PA<1, 1> is a projection area of the micro-projector MP<1, 1>, a projection area PA<1, 2> is a projection area of the micro-projector MP<1, 2>, a projection area PA<1, 3> is a projection area of the micro-projector MP<1, 3>, and a projection area PA<1, 4> is a projection area of the micro-projector MP<1, 4>. As illustrated in FIG. 1, each of the projection areas PA<a, b> of the micro-projectors MP<a, b> is the area to be overlapped with the micro-lens array MLA. The notation PA<a, b> (a and b are natural numbers of 1 or more) is a notation for distinguishing the plurality of projection areas.

Figure 2:
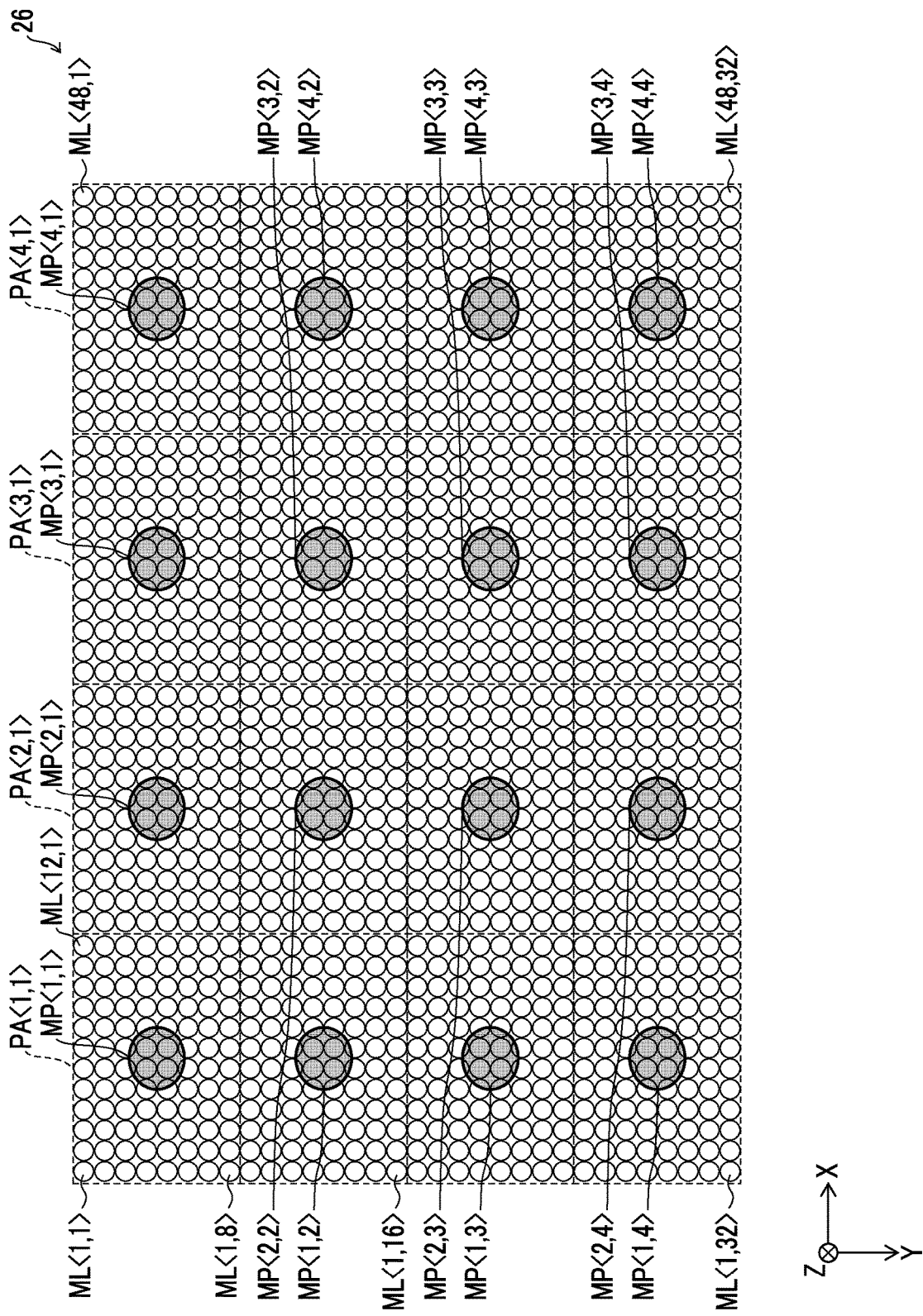
FIG. 2 is a front view of a display unit of the three-dimensional display according to Embodiment 1 of the present disclosure.

FIG. 2 is a front view of the display unit 26 of the three-dimensional display 31.

As illustrated, the projection areas PA<1, 1> to PA<4, 4> of a total of 16 micro-projectors MP<1, 1> to MP<4, 4> disposed in A rows and A columns overlap the micro-lens array MLA. In this embodiment, although a case where a total of 16 micro-projectors are disposed in 4 rows and 4 columns is described as an example, the number of micro-projectors and a disposition pattern thereof are not limited thereto, and may be appropriately determined.

In this embodiment, a case where the micro-lens array MLA includes 1536 micro-lenses ML<1, 1> to ML<48, 32>, that is, a case where 56 micro-lenses are provided for each projection area of each micro-projector is be described as an example, but is not limited thereto. The total number of micro-lenses may be appropriately selected from several tens of micro-lenses to several thousands of micro-lenses and the number of micro-lenses per projection area of each micro-projector can also be selected as appropriate.

FIG. 3 is a sectional view for explaining the disposition of the micro-lens array MLA and the micro-projectors MP<1, 1> to MP<4, 4> illustrated in FIG. 2. In FIG. 3, only the micro-projector MP<1, 1> and the micro-projector MP<2, 1> are illustrated, and illustration of other micro-projectors is omitted.

Since 16 micro-projectors including the micro-projector MP<1, 1> and the micro-projector MP<2, 1> illustrated have the same configuration and the same disposition and thus, only the configuration and disposition of the micro-projector MP<1, 1> will be described here.

The micro-projector MP<1, 1> includes a display element DE<1, 1> and a projection optic PO<1, 1> for projecting the display image displayed by the display element DE<1, 1>. A display image displayed by the display element DE<1, 1> is formed on a projection plane FP by the projection optic PO<1, 1>. The projection plane PP is a transparent screen, a light diffusion plate, or the like. Here, assuming that a distance between the display element DE<1, 1> and the optical center of the projection optic PO<1, 1> is a display element distance Ld, a distance between the optical center of the projection optic PO<1, 1> and the projection plane PP is a projection distance Lp, and a focal length of the projection optic PP<1, 1> is fp, the display element DE<1, 1> and the projection optic PO<1, 1> are disposed so as to satisfy the relationship of 1/Ld+1/Lp=1/fp. The notation PO<a, b> (a and b are natural numbers of 1 or more) is a notation for distinguishing a plurality of identical projection optics, and the notation DE<a, b> (a and b are natural numbers of 1 or more) is a notation for distinguishing a plurality of identical display elements. Although a simple convex lens is illustrated as the projection optic PO<a, b> in FIG. 3, it may be a compound lens including a plurality of lenses or it may be a projection optic including a reflecting mirror.

On the projection plane PP, a display image displayed by the display element DE<1, 1> is projected as a real image magnified by (Lp/Ld) times. The larger the magnification, the larger the three-dimensional image is displayed and thus, it is desirable that the enlargement factor is large within a range in which the resolution is secured. This is because if the micro-projector can be made smaller by increasing the magnification, the manufacturing cost of the micro-projector can be reduced. The magnification is preferably 1 time or more, more preferably 2 times or more. The distance between the projection plane PP and the micro-lens array MLA is set to be equal to a focal length fm of the micro-lenses ML<1, 1> to ML<48, 32>.

The projection optics PC<1, 1> to PO<4, 4> of the micro-projectors MP<1, 1> to MP<4, 4> project the display images of the display elements DE<1, 1> to DE<4, 4> toward the micro-lens array MLA.

Figure 4:
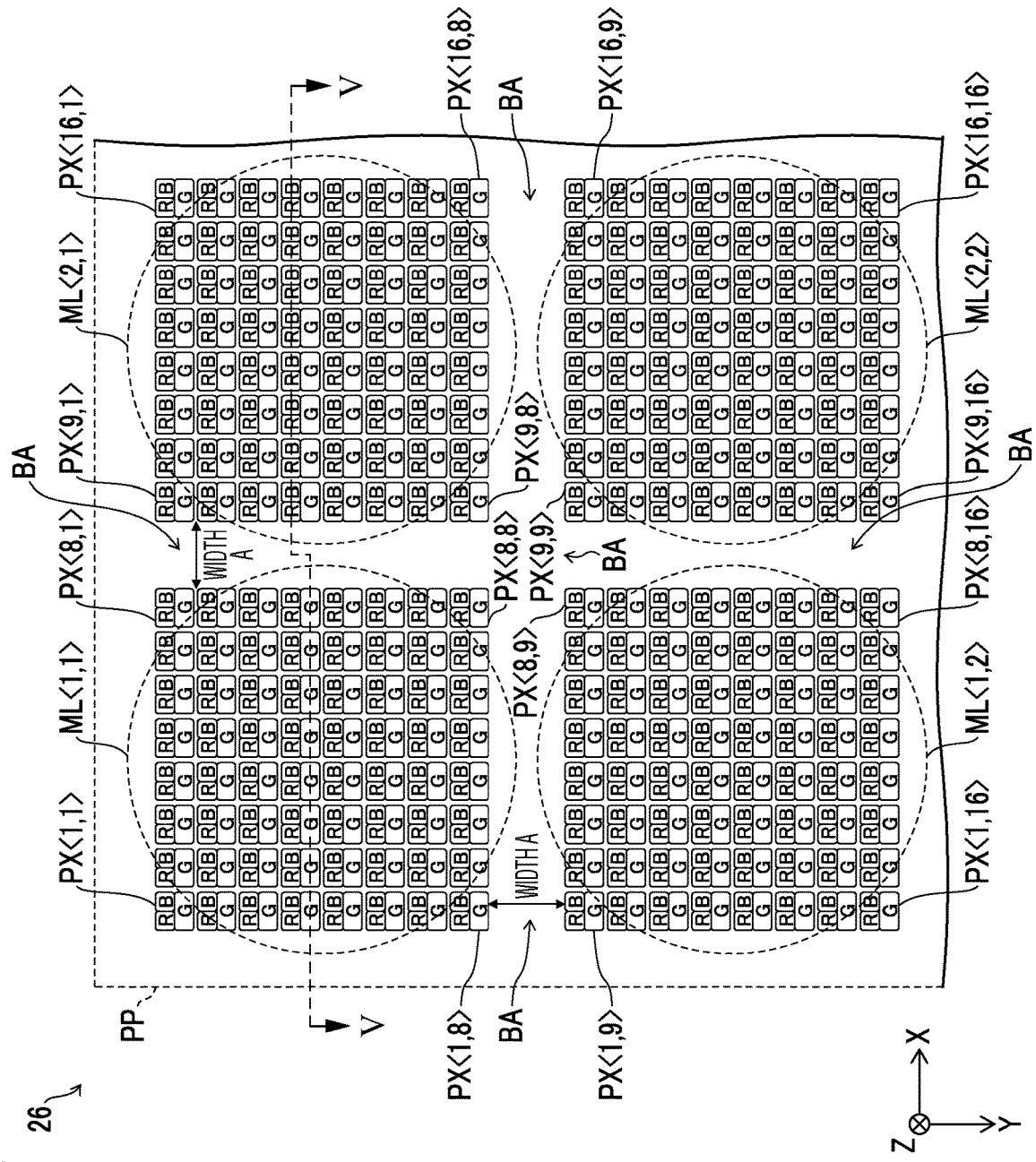
FIG. 4 is a plan view of a projected image of the three-dimensional display according to Embodiment 1 of the present disclosure.

FIG. 4 is a schematic view illustrating an image that is obtained by projecting the display image displayed by the display element DE<1, 1> provided in the display unit 26 of the three-dimensional display 31 to be formed on a projection plane PP, and the micro-lens array MLA.

A total of 64 projected images PX<s, t> of 8 rows and 8 columns correspond to each of the micro-lenses ML<1, 1> to ML<48, 32>. For example, as illustrated, the projected images PX<1, 1> to PX<8, 0> correspond to the micro-lens ML<1, 1> and each projected image of PX<1, 1> to PX<8, 8> corresponds to one pixel region on the display element DE<a, b>. The projected image PX<s, t> is a pixel on the display element DE<a, b>, that is, a projected image by the projection optic PO<a, b>, obtained by projecting the display image displayed by the display element DE<a, b>. The notation PX<s, t> (s and t are natural numbers of one or more) is a notation for distinguishing a plurality of projected images.

Although details will be described later, matters that each of the micro-lenses ML<1, 1> to ML<48, 32> corresponds to 64 projected images PX<s, t> corresponds to an image of a certain object viewed from 64 different directions. Hereinafter, the pixel number of the display element OE<a, b> corresponding to each micro-lens ML<i, j> is represented by N (it is not the total number of pixels of the display element DE>a, b<. In this example, the total number of pixels is N×8×12=6144.). Accordingly, an equation N=64 is satisfied in this embodiment, but is not limited thereto, the pixel number of the display element DE<a, b> corresponding to each micro-lens ML<i, j> can be selected as appropriate in accordance with accuracy of the three-dimensional image. In order to display a three-dimensional image with higher 3D-quality, it is demanded to increase the pixel number of the display element DE<a, b> corresponding to each micro-lens ML<i, j>. In this embodiment, since the three-dimensional display 31 corresponds to full color display, although a case where each pixel of the display element DE<a, b> includes sub-pixels emitting red, blue and green, and half of each pixel is assigned to a green sub-pixel and the other half of each pixel is assigned to a red sub-pixel and a blue sub-pixel is exemplified, the configuration of each pixel is not limited thereto.

As illustrated in FIG. 4, between adjacent micro-lenses ML<i, j>, that is, between the micro-lenses ML<1, 1> and the micro-lenses ML<2, 1>, between the micro-lens ML<1, 1> and the micro-lens ML<1, 2>, and between the micro-lens ML<1, 1> and the micro-lens ML<2, 2>, it is desirable to provide a buffer area BA having a width A in the X-direction and the Y-direction in the figure so that the 64 projected images PX<s, t> groups corresponding to each micro-lens ML<i, j> are not continuous with each other.

Processing accuracy of the lens may be reduced in the periphery of each micro-lens ML<i, j>, which may cause a reduction in display accuracy, and the reason for providing the buffer area BA in this way is to avoid such deterioration in display accuracy. By providing such a buffer area (buffer area) BA, it becomes easy to dispose the micro-projectors MP<a, b> without overlapping the projection areas PA<a, b> of the micro-projectors MP<a, b> with each other. In this embodiment, the case where the buffer area BA having the same width A in the X-direction in the figure and the Y-direction in the figure is provided is described as an example, but is not limited thereto, and the buffer area BA having different widths in the X-direction in the figure and in the Y-direction in the figure may be provided.

The distance between adjacent projected images PX<s, t> on the projection plane PP is (Lp/Ld) times the distance between adjacent pixels on the display element DE<a, b>. Each display element DE<a, b> is provided with a buffer area BA' which is a non-light emitting area whose width is (A·Ld/Lp) so as to correspond to the width A of the buffer area BA on the projection plane PP.

Figure 5:
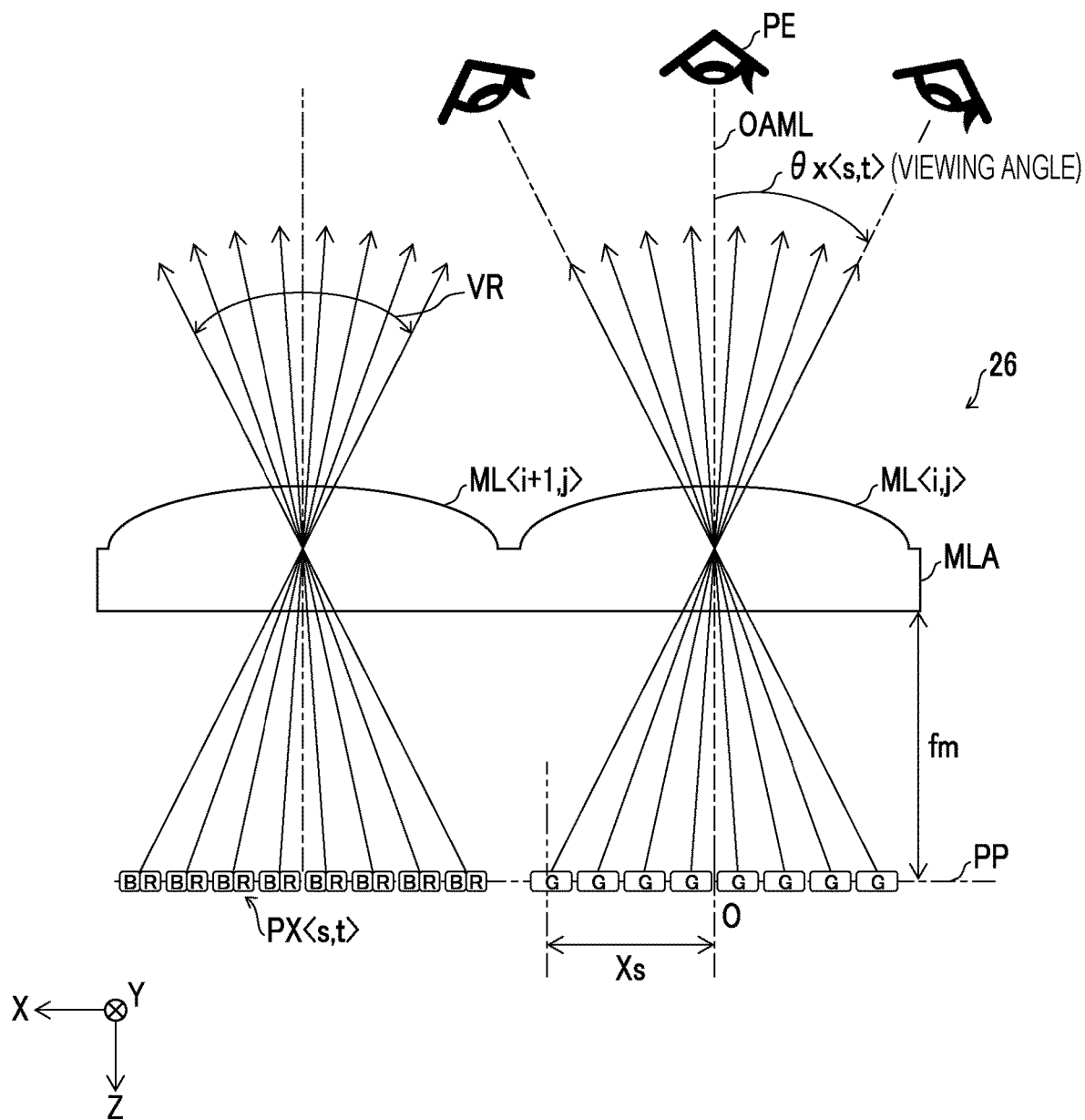
FIG. 5 is a view for explaining a 3D view region of the three-dimensional display according to Embodiment 1 of the present disclosure.

FIG. 5 is a sectional view taken along the line V-V of the display unit 26 illustrated in FIG. 4 and illustrates the relationship between the projected image PX<s, t> of the display element DE<a, b> formed on the projection plane PP and the micro-lens ML<i, j>.

As illustrated, the distance between the projection plane PP and the micro-lens array MLA is set to be equal to the focal length fm of the micro-lens ML<i, j>. Accordingly, light emitted from the projected image PX<s, t> is collected by the micro-lens ML<i, j>, and when the light is transmitted through the micro-lens ML<i, j>, the light is emitted in a fixed direction without diverging as light parallel to each other. The traveling direction of the light emitted from the projected image PX<s, t> can be calculated as follows. When the intersection of an optical axis OAML of the micro-lens ML<i, j> and the projection plane PP is set as the origin O and the coordinates of the projected image PX<s, t> are set as (Xs, Yt), the light emitted from the projected image PX<s, t> travels at $\theta x$ in the X-direction and at $\theta y$ in the V-direction with respect to the optical axis OAML of the micro-lens ML<i, j>. Here, $\tan \theta x = -Xs/fra$, and $\tan \theta = -Yt/fm$ are satisfied.

As such, in the display unit 26 of the three-dimensional display 31, each of the micro-lenses ML<i, j> emits light in different directions corresponding to the projected image PX<s, t>. The entire region into which each micro-lens emits light is a 3D view region VR of an observer PE. As illustrated, when the observer PE changes the viewing direction of the display unit 26, the projected image PX<s, t> changes. For that reason, displaying correctly the light signal of the object viewed from the directions to which the projected images (projected image) PX<s, t> correspond enables the observer PE to recognize a natural three-dimensional image by changing the viewpoint.

Regarding Configuration of Display Element DE<a, b>

Figure 6A:
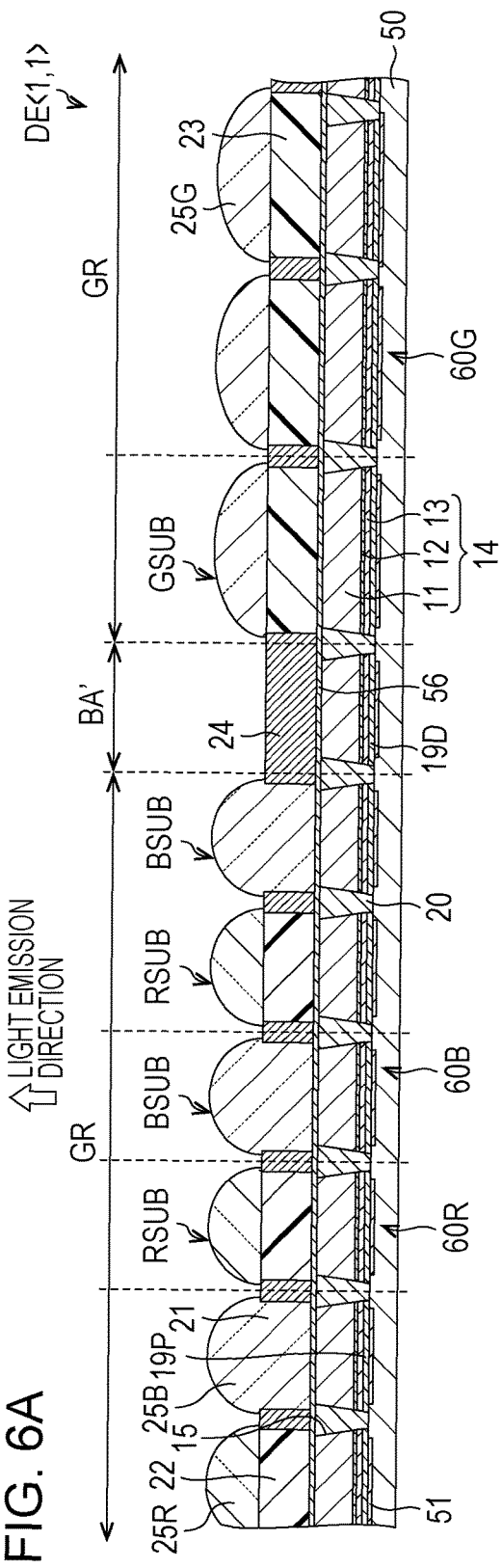
FIGS. 6A and 6B are sectional views of a display element provided in the display unit of the three-dimensional display according to Embodiment 1 of the present disclosure.
Figure 6B:
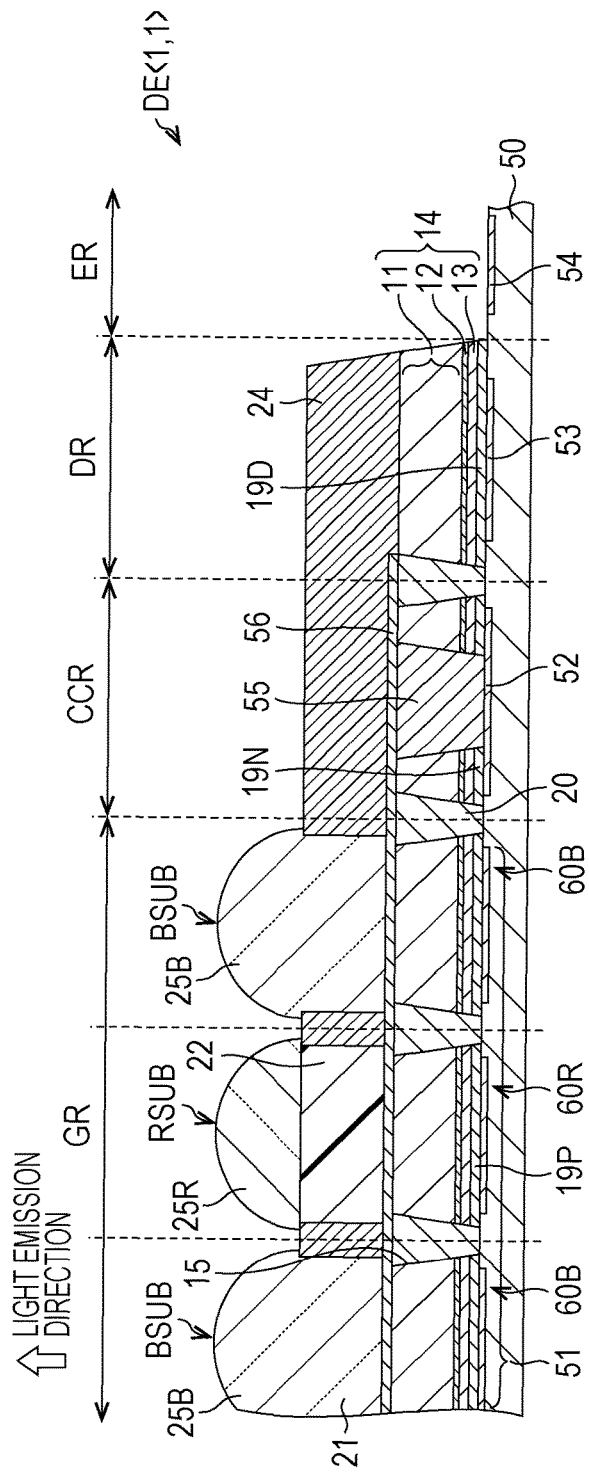

FIG. 6A is a sectional view illustrating a part of a display element DE<1, 1> of a portion corresponding to V-V line of the display unit 26 illustrated in FIG. 4, and FIG. 6B is a sectional view illustrating a common connection region CCR, a dummy region DF, and an external region ER in the display element DE<1, 1>.

As illustrated in FIG. 6A, in the pixel region GR of the display element DE<1, 1>, a plurality of pixels are disposed in an array, and each pixel includes one blue sub-pixel BSUB, one red sub-pixel RSUB, and one green sub-pixel GSUB (see FIG. 4). Blue light (for example, peak wavelength 460 nm±15 nm), red light (for example, peak wavelength 630 nm±15 nm), and green light (for example, peak wavelength 520 nm±15 nm) are emitted from the blue sub-pixel BSUB, the red sub-pixel RSUB, and the green sub-pixel GSUB, respectively, in accordance with light emission amount data of each pixel from the drive circuit 27, that is, color tone data of each sub-pixel. Adjusting the light emission amount of each sub-pixel enables each pixel to emit light of various colors.

In order to reduce the manufacturing cost while increasing the resolution of the display element DE<a, b>, the pixel size is preferably small, and the pixel size may be 60 μm or less, preferably 20 μm or less, and more preferably 10 μm or less. Much the same is true on the maximum length of the sub-pixel, and thus the maximum length of the micro light emission element.

As illustrated in FIG. 6B, the display element DE<1, 1> includes the common connection region CCR, the dummy region DR, and the external region ER, together with the pixel region GR.

As illustrated in FIG. 6A and FIG. 6B, one red sub-pixel RSUB includes one micro LED element 60R (micro light emission element), one blue sub-pixel BSUB includes one micro LED element 60B (micro light emission element), and one green sub-pixel GSUB includes one micro LED element 60G (micro light emission element). The number of micro light emission elements included in each sub-pixel may be plural.

The micro LED element 60R is a micro LED element that emits blue light and is disposed in the red sub-pixel RSUB, the micro LED element 60B is a micro LED element that emits blue light and is disposed in the blue sub-pixel BSUB, and the micro LED element 60G is a micro LED element that emits blue light and is disposed in the green sub-pixel GSUB and thus, the micro LED element 60R, the micro LED element 60B, and the micro LED element 60G have the same structure. In FIGS. 6A and 6B, although a configuration in which a wavelength conversion layer is used for the red sub-pixel RSUB and the green sub-pixel GSUB is exemplified, like the blue sub-pixel BSUB, a configuration in which the red sub-pixel RSUB has a micro LED element that emits reel light may be adopted, or a configuration in which the green sub-pixel GSUB has a micro LED element that emits green light may be adopted.

In this embodiment, the red sub-pixel RSUB, the blue sub-pixel BSUB, and the green sub-pixel GSUB are shaped as illustrated in FIGS. 1 and 6, but is not limited thereto, and the shape of each color sub-pixel may be in a pattern in which rectangles are disposed in parallel, and can be appropriately changed in accordance with the size and application demanded for each color sub-pixel. The shape is not limited to a rectangle.

Furthermore, it is also possible to add sub-pixels of other colors such as yellow if demanded, and if it is not demanded to make the three-dimensional display correspond to full color display, it is also possible to configure each pixel with only one or two kinds of sub-pixels.

As illustrated in FIGS. 6A and 6B, each of the micro LED element 60R, the micro LED element 60B, and the micro LED element 60G, which are micro LED elements emitting blue light, includes a nitride semiconductor layer 14 including an N-side layer 11, a light emission layer 12, and a P-side layer 13, and a P-electrode 19P and a common N-electrode 56. The common N-electrode 56 is disposed on the light emitting direction side, and the P-electrode 19P is disposed on the drive circuit substrate 50 side. In this embodiment, half of each pixel is assigned to the green sub-pixel GSUB, and the other half of each pixel is assigned to the red-sub pixel RSUB and the blue sub-pixel BSUB and thus, the size of the micro LED element 60G is the largest, the size of the micro LED element 60R and the size of the micro LED element 60B are the same and smaller than the size of the micro LED element 60G.

The P-electrode 19P is connected to a P-drive electrode 51 on the drive circuit substrate 50, the common N-electrode 56 is connected to an N-drive electrode 52 on the drive circuit substrate 50 with a plug 55 interposed therebetween in the common connection region CCB illustrated in FIG. 6B, and the micro LED elements 60R, 60B and 60G are supplied with current from corresponding P-drive electrodes 51 and emit light.

A light emission direction is a direction opposite to the drive circuit substrate 50 and is on the common N-electrode 56 side. The micro LED elements 60R, 60B, and 60G are divided individually by pixel isolation trenches 15, and the pixel isolation trench 15 is filled with a filling material 20.

A pixel drive circuit is disposed in a pixel region GR of the drive circuit substrate 50, and a row selection circuit, a column signal output circuit, an image processing circuit, an input/output circuit, and the like arc disposed mainly in the dummy region DR of the drive circuit substrate 50. Dummy electrodes 53 on the drive circuit substrate 50 are disposed to fix the nitride semiconductor layer 14 and to shield these circuits from light. The dummy region DR is a region other than the pixel region GR, the common connection region CCR, and the external region ER of the display element DE<1, 1>.

As illustrated in FIG. 6B, the nitride semiconductor layer 14 is disposed in the common connection region CCR and the dummy region DR, but the nitride semiconductor layer 14 does not emit light and is disposed to secure surface planarity. By securing planarity of the area of the drive circuit substrate 50 as large as possible, it becomes easy to form a wavelength conversion layer and a micro-lens. For example, if the nitride semiconductor layer 14 is not disposed in the dummy region DR, a step with a height, of several urn occurs in the vicinity of the pixel region GR, a striation occurs when applying a resin for forming the wavelength conversion layer or the micro-lens, and a problem of not being able to form the wavelength conversion layer or micro-lens of uniform thickness in the pixel region occurs.

The external region ER defines an outer edge of the display element DE<1, 1>, and includes a cutting area for separating the display element DE<1, 1> into pieces and an I/O electrode 54 which is a connection portion with an external circuit such as a wire bond pad. The nitride semiconductor layer 14 is removed in the external region ER.

As illustrated in FIG. 6A, the buffer area BA' which is a non-light emitting area is provided between the pixel regions GR. In FIG. 6A, in the buffer area BA', the nitride semiconductor layer 14, the dummy P-electrode 19D, the common N-electrode 56, and the P-drive electrode 51 that have the same structure as the micro LED elements (micro light emission elements) 60R, 60G, and 60B are provided, and the planarization portion 24, which is the light shielding material, is provided to cover them. That is, dummy elements provided in the buffer area BA' have the same physical structure as the micro LED elements 60R, 60G, and 60B. In the case of such a configuration, there is an effect of facilitating manufacture by sharing the structure of pixel region GR and buffer area BA', but is not limited thereto.

Configuration of Red Sub-Pixel RSUB, Blue Sub-Pixel BSUB and Green Sub-Pixel GSUB In the blue sub-pixel BSUB, a transparent portion 21 including a transparent resin pattern is provided on the common N-electrode 56, and the blue light emitted from the micro LED element COB is emitted to the outside as it is. The transparent portion 21 may contain scattering particles.

In the red sub-pixel RSUB, a red conversion portion 22 (a first wavelength conversion layer) which is a resin pattern containing a material for converting the wavelength of the blue light emitted by the micro LED element 60R into red light is provided on the common N-electrode 56, and the red light is emitted. The red conversion portion 22 may contain scattering particles.

In the green sub-pixel GSUB, a green conversion portion 23 (a second wavelength conversion layer) which is resin pattern containing a material for converting the wavelength of the blue light emitted by the micro LED element 60G into green light is provided on the common N-electrode 36, and the green light is emitted. The green conversion portion 23 may contain scattering particles.

As illustrated in FIG. 6A, a micro-lens 25B (light convergence portion) is disposed on the transparent portion 21, a micro-lens 25R (light convergence portion) is dispose on the red conversion portion 22, and a micro-lenses 25G (light, convergence portion) is disposed on the green conversion portion 23. Each of the micro-lenses 25R, 25G, and 25B is formed of a transparent resin in a lens shape, and has an effect of converging light emitted from the transparent portion 21, the red conversion portion 22, and the green conversion portion 23. It is desirable that the micro-lenses 25R, 25G, and 25B completely cover the transparent portion 21, the red conversion portion 22, and the green conversion portion 23, respectively.

Figure 7A:
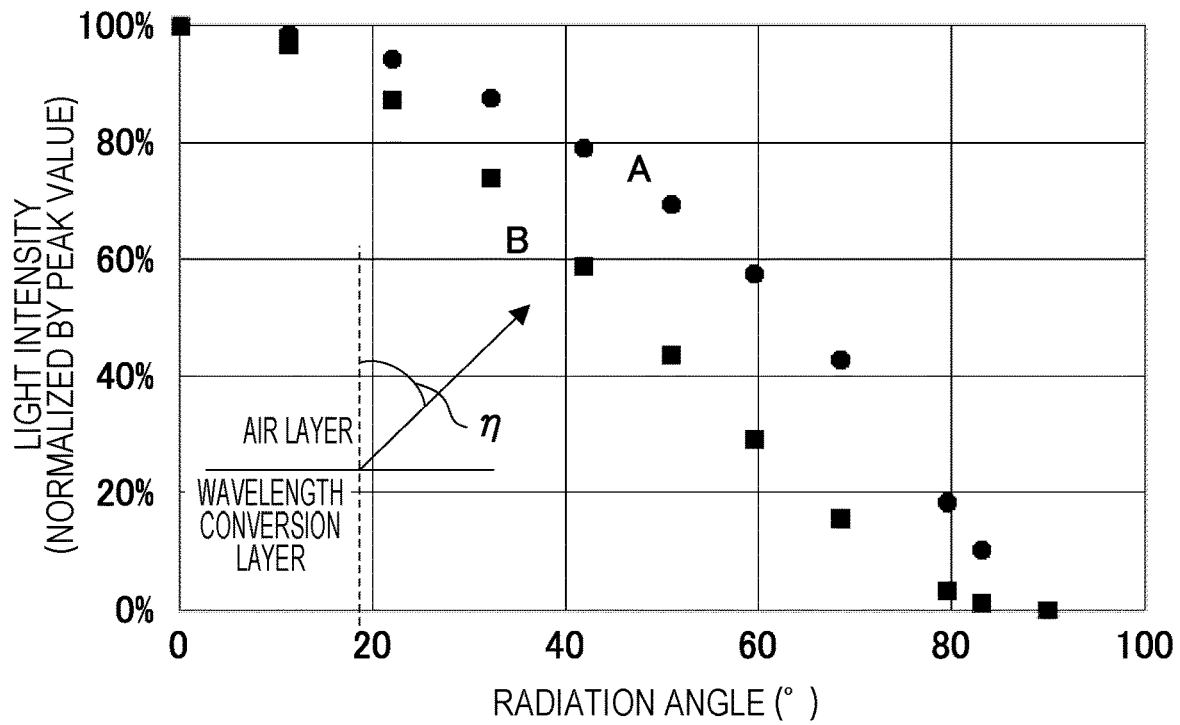
FIGS. 7A and 7B are graphs illustrating a relationship between light intensity distribution of a three-dimensional display not including a micro-lens as a light convergence portion and light intensity distribution of a three-dimensional display including a micro-lens as a light convergence portion.

FIG. 7A is a graph which illustrates, in a case where an area of a solid angle is not taken into consideration, light intensity distribution of a three-dimensional display without micro-lenses as a light convergence portion and light intensity distribution of the three-dimensional display 31 provided with the micro-lenses 25R, 25G, and 25B as the light convergence portion.

Figure 7B:
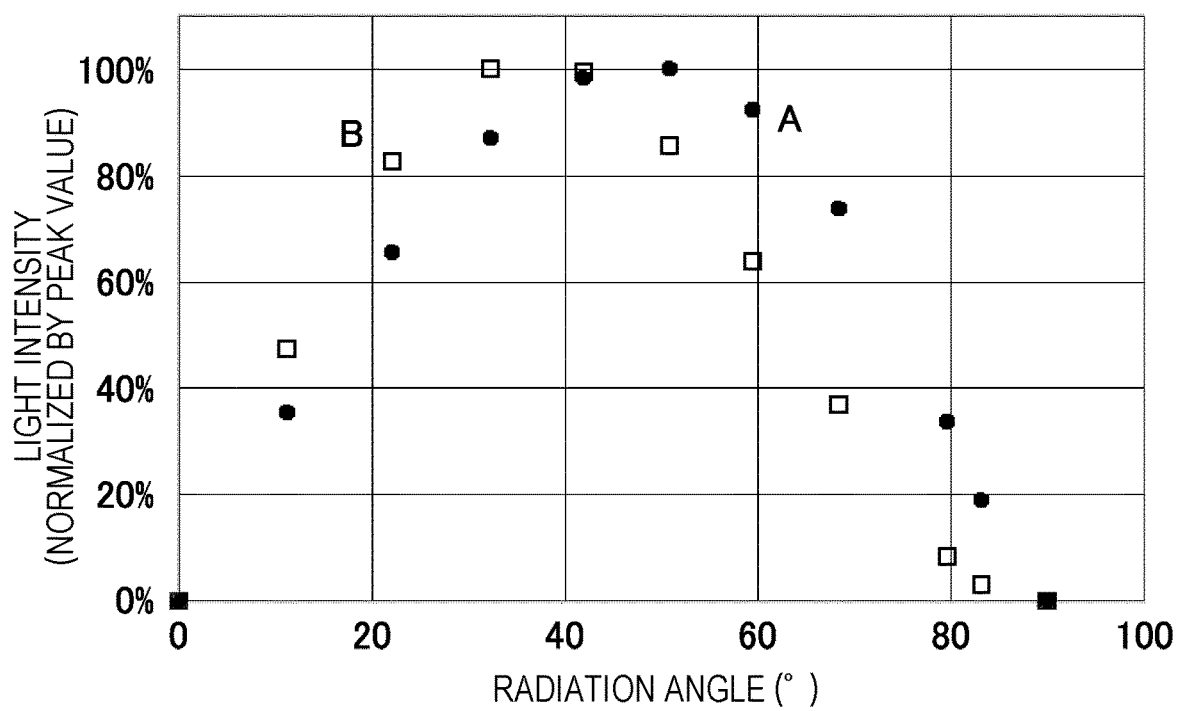

On the other hand, FIG. 7B is a graph which illustrates, in a case where an area of the solid angle is taken into consideration, light intensity distribution of a three-dimensional display without micro-lenses as the light convergence portion and light intensity distribution of the three-dimensional display 31 provided with the micro-lenses 25R, 25G, and 25B as the light convergence portion.

In FIGS. 7A and 7B, the red conversion portion 22 and the green conversion portion 23 are collectively referred to as a wavelength conversion layer.

As illustrated in the plot A of FIG. 7A, in a case where there is no micro-lenses 25R and 25G, the red light emitted from the red conversion portion 22 and the green light emitted from the green conversion portion 23 spread from 0 degrees to 90 degrees at a radiation angle η (an angle between the vertical line of the surface of the wavelength conversion layer (red conversion portion 22 or green conversion portion 23) and the emitted light). As in the A plot of FIG. 7B, considering the area of the solid angle, the radiation angle η has a peak of radiation intensity in the range of approximately 40 degrees to 60 degrees.

Accordingly, in order to effectively utilize the red light and the green light emitted by the display element DE<a, b>, it is demanded to converge the light of the radiation angle n at least up to approximately 60 degrees. In order to converge light of radiation angle η, in a case where the image forming optical system is a lens, if the focal length of the lens is fp, the optical aperture φ of the lens is demanded to be at least φ=2·fp·tan η, and at η=60 degrees, φ≈3.5·fp. If the lens diameter is small, not only red light and green light which are not converged are wasted, but also they are reflected inside a device and become stray light, which may reduce a contrast of the display image.

Light having a large radiation angle η can be refracted in the light emission direction by arranging the micro-lenses 25R and 25G and thus, as in the B plot of FIG. 7A and of FIG. 7B, the radiation angle distribution of red light and green light can be narrowed and converged in the optical axis direction. Accordingly, convergence efficiency can be enhanced with a smaller lens. Alternatively, if the lens size is the same, more light can be converged to brighten the display image. In a case where certain luminance is demanded, power consumption can be reduced by reducing the drive current of the micro LED elements 60R, 60B, and 60G.

The same applies to blue light, and in the case of the blue sub-pixel BSUB, there is no wavelength conversion layer and the blue light emitted from the micro LED element 60B is emitted as it is, but blue light is generally emitted isotropically in the light emission layer 12 and thus, the blue light has emission angle distribution similar to that in the case where there is a wavelength conversion layer and has the same effect as in the case of red light and green light described above. For this reason, in this embodiment, the micro-lenses 25R, 25G, and 25B are provided as the light convergence portions not only for the red sub-pixel RSUB and the green sub-pixel GSUB but also for the blue sub-pixel BSUB. In this embodiment, the case where the micro-lens is provided as the light convergence portion has been described as an example, but is not limited thereto, and the convergence portion may be a reflective wall having an effect of converging light emitted by each of the color sub-pixels RSUB, GSUB, and BSUB forward.

Regarding Characteristics of Three-Dimensional Display

The inventor actually evaluated luminance of a three-dimensional display having the following configuration different from the three-dimensional display 31 described above.

Configuration of Micro-Lens Array MLA

The disposition pitch of the micro-lens ML<i, j> is 250 μm in both the X-direction and the Y-direction The focal length fm of the micro-lens ML<i, j> is 250 μm The number of micro-lenses ML<i, j> is 600×400 micro-lenses, (i=1 to 400, j=1 to 600)

Configuration of Projected Image PX<s, t>

The number of projected images PX<s, t> is 36 images in 6 rows and 6 columns (s, t=1 to 6)

The arrangement center of 36 projected images PX<s, t> is on the optical axis of the micro-lens ML<i, j>

The pitch of the projected image PX<s, t> is 31.25 μm in both the X-direction and the Y-direction The 3D view region VR is ±17.35 degrees in both the X-direction and the Y-direction The width of the buffer area BA on the projection plane PP is 62.5 μm Configuration of Micro-Projector MP<a, b>
  The focal length fp of the projection optic PO<a, b> is 20 mm
  F value of the projection optic PO<a, b> is 1.2 (optical aperture 16.7 mm)
  Projection distance Lp=82.5 mm, display element distance Ld=26.4 mm (magnification: 3.125 times)
  The size of the projection area PA<a, b> is 37.5 mm×25 mm
  Micro-projectors MP<a, b> are disposed in 4 rows and 4 columns (a, b=1 to 4), 16 micro-projectors in total Configuration of the Display Element DE<a, b>
  Effective pixel number: 900×600, pixel size is 10 μm, width of the buffer area BA' is 20 μm
  Emitting area is 12 mm×8 mm
  Micro LED elements 60R, 60B, and 60G are blue light emission elements, peak wavelength is 460 nm
  The size of the blue sub-pixel BSUB and the red sub-pixel RSUB is 5 μm square, and the size of the green sub-pixel GSUB is 5 μm×10 μm.
  Red sub-pixel RSUB: Blue light is converted to red by a wavelength conversion layer in which quantum dots are mixed in resin.
  Green sub-pixel GSUB: Blue light is converted to green by a wavelength conversion layer in which quantum dots are mixed in resin.
  Blue sub-pixel BSUB: Blue light of the micro LED element 60B is emitted through transparent resin.
  Drive circuit substrate: A drive circuit is formed on a silicon substrate by a CMOS process.

In the three-dimensional display configured in this way, the currents of 0.325 μA, 1.65 μA, and 0.325 μA were applied to the micro LED element 60R, the micro LED element 60G, and the micro LED element 60S, respectively, to light up all the micro LED elements. At this time, the luminance of the display unit 26 observed at a distance of 1 m from a central portion of the three-dimensional display, that is, the luminance of the micro-lens array MLA at a distance of 1 m from the micro-lens array MLA in a case where all the pixels of the display element DE<a, b> have the maximum tone was 1086 Cd/m². The power consumption per micro-projector MP<a, b> at this time was 5.3 W. This is a state in which the entire screen of the display unit 26 is lit in white, that is, a case where all the pixels of the display element DE<a, b> have the maximum tone, and power consumption in a normal display state is lower than this state.

In a case where a liquid crystal display for a normal flat display and a micro-lens array are combined to perform three-dimensional display by integration imaging technology, such high luminance may not be realized for a three-dimensional display with such high 3D-quality. For example, in a case where integration imaging technology is applied by using a 7-inch 4K liquid crystal monitor with relatively high luminance of 1000 Cd/m² and combining the micro-lens array MLA described above, since the pixel size is approximately 37 nm, the micro-lenses of 250-μm size can only cope with pixels of 6 rows×6 columns (N=36), and high-accuracy three-dimensional display such as 8 rows and columns may not be realized. The luminance of the micro-lens array MLA at a distance of 1 m from the micro-lens array MLA may not be realized only at 23 Cd/m² (≈1000 cd/m²/N). As such, in three-dimensional display by integration imaging technology using a conventional flat display, the luminance of the display unit, that is, the luminance of the micro-lens array MLA at a distance of 1 m from the micro-lens array MLA is (1000/N) cd/m², whereas luminance much higher than the luminance can be realized in accordance with the display unit according to this embodiment.

As such, in accordance with evaluation by the inventor, in the three-dimensional display using the plurality of micro-projectors MP<a, b> of this embodiment, it has been proved that the luminous efficiency is very high, and the same level of luminance as that of the normal flat panel display can be realized without difficulty.

Also, in order to evaluate the effect of the micro-lenses 25R, 25G, and 25B as a light convergence portion, the inventor made a display element of a type not provided with the micro-lenses 25R, 25G, and 25B and evaluated the luminance. In a three-dimensional display not provided with the micro-lenses 25R, 25G and 25B, the Luminance of the micro-lens array MLA at a distance of 1 m from the micro-lens array MLA was 760 Cd/m² in a case where the display unit 26 is viewed from the front. The value of this luminance is approximately 30% lower than a luminance value of the three-dimensional display of this embodiment provided with the micro-lenses 25R, 25G, and 25B when compared with the luminance value of the three-dimensional display of this embodiment.

As the projection optic PO<a, b> of the micro-projector MP<a, b>, a bright lens having an optical aperture of 16.7 mm and an F value of 1.2 was used. The optical aperture of the projection optic PO<a, b> is desirably large. For example, in a case where the optical aperture has the same size as the light emitting portion of the display element DE<a, b>, an amount of light incident on the projection optic PO<a, b> from the pixels in the peripheral region is reduced compared to that from the pixels at the central region of the display element DE<a, b>. This is because in a case where radiation angle dependency is the same between the central region and the peripheral region, light emitted to the outside of the projection optic PO<a, b> from the external region is not used. That is, when the optical aperture becomes smaller, a light collection ratio decreases in the external region as compared with that in the central region of the display element DE<a, b> and the peripheral portion of the projection area PA<a, b> becomes dark and thus, a phenomenon called darkening occurs at the peripheral portion of the 3D view region VR corresponding to the peripheral of the projection area PA<a, b>. In order to improve such display non-uniformity, it is desirable to increase the optical aperture of the projection optic PO<a, b>. The optical aperture is desirably at least larger than the light emitting portion of the display element DE<a, b>. As described above, according to this embodiment, it is possible to realize a three-dimensional display that displays a three-dimensional image of such a size as to be placed on a palm brightly with high resolution and high 3D-quality.

Embodiment 2

Embodiment 2 of the present disclosure will be described below. Here, for convenience of explanation, the same reference symbols will be appended to members having the same functions as the members described in Embodiment 1, and the description thereof will not be repeated.

Figure 8:
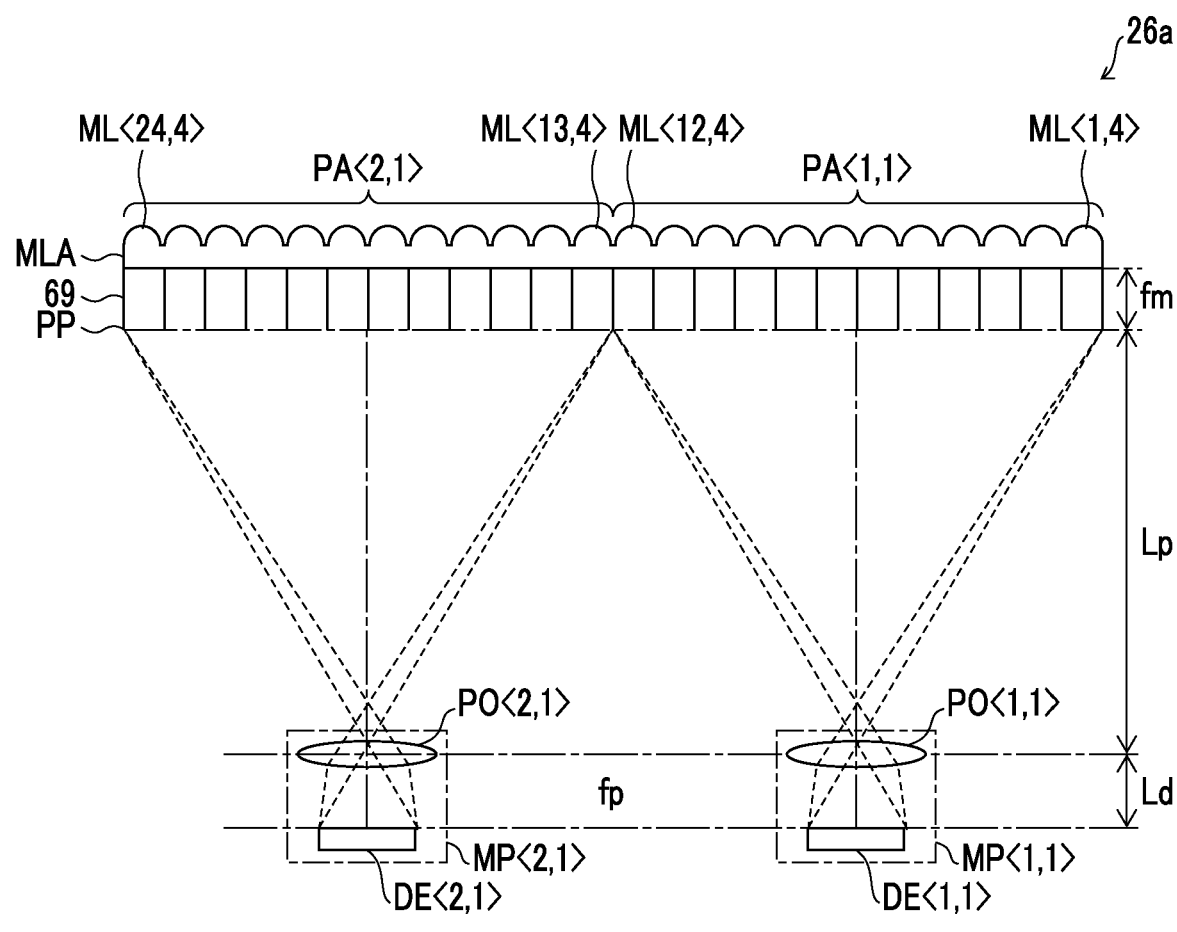
FIG. 8 is an enlarged sectional view schematically illustrating a configuration of a display unit of a three-dimensional display according to Embodiment 2 of the present disclosure.

FIG. 8 is a view schematically illustrating a configuration of a display unit 26a provided in the three-dimensional display according to Embodiment 2. As illustrated in FIG. 8, the matters that the display unit 26a includes one micro-lens array MLA and a plurality of micro-projectors MP<a, b> are the same as those of the Embodiment 1. The difference is that the display unit 26a includes a shielding wall 69 extending from the micro-lens array MLA to the projection plane PP between the micro-lenses ML<i, j> adjacent in the X-direction and the Y-direction in the figure.

The shielding wall 69 is formed of a material including a light absorbing material. The micro-lens ML<i, j> and the micro-lens ML<i+1, j> and the micro-lens ML<i, j> and the micro-lens ML<i−1, j> adjacent in the X-direction in the figure, and the micro-lens ML<i, j> and the micro-lens ML<i, j+1> and the micro-lens ML<i, j> and the micro-lens ML<i, j−1> adjacent in the Y-direction in the figure are separated from each other by the shielding wall 69. As such, the shielding wall 69 keeps an image including the projected image PX<s, t> formed on the projection plane PP from leaking to the adjacent micro-lens ML<i, j>.

Although not illustrated, the shielding wall 69 has a rectangular shape surrounding the outer periphery of each micro-lens ML<i, j> in top view. The shielding wall 69 is most preferably configured to partition a space from a lower surface of the micro-lens ML<i, j> to the corresponding projection plane PP. The shielding wall 69 may be disposed between the projection plane PP, that is, a transparent screen, and the micro-lens array MLA.

As such, in the display unit 26a included in the three-dimensional display according to Embodiment 2, since adjacent micro-lenses ML<i, j> are separated from each other by the shielding wall 69, there is no light leakage between the adjacent micro-lenses ML <i, j>, and the image quality of the three-dimensional image can be improved.

Embodiment 3

Embodiment 3 of the present disclosure will be described below. For convenience of explanation, the same reference symbols are appended to members having the same functions as the members described in Embodiment 1, and the description thereof will not be repeated.

A configuration of a display unit 26b provided in a three-dimensional display according to Embodiment 3 is different from that of the display unit 26 described in Embodiment 1.

Figure 9:
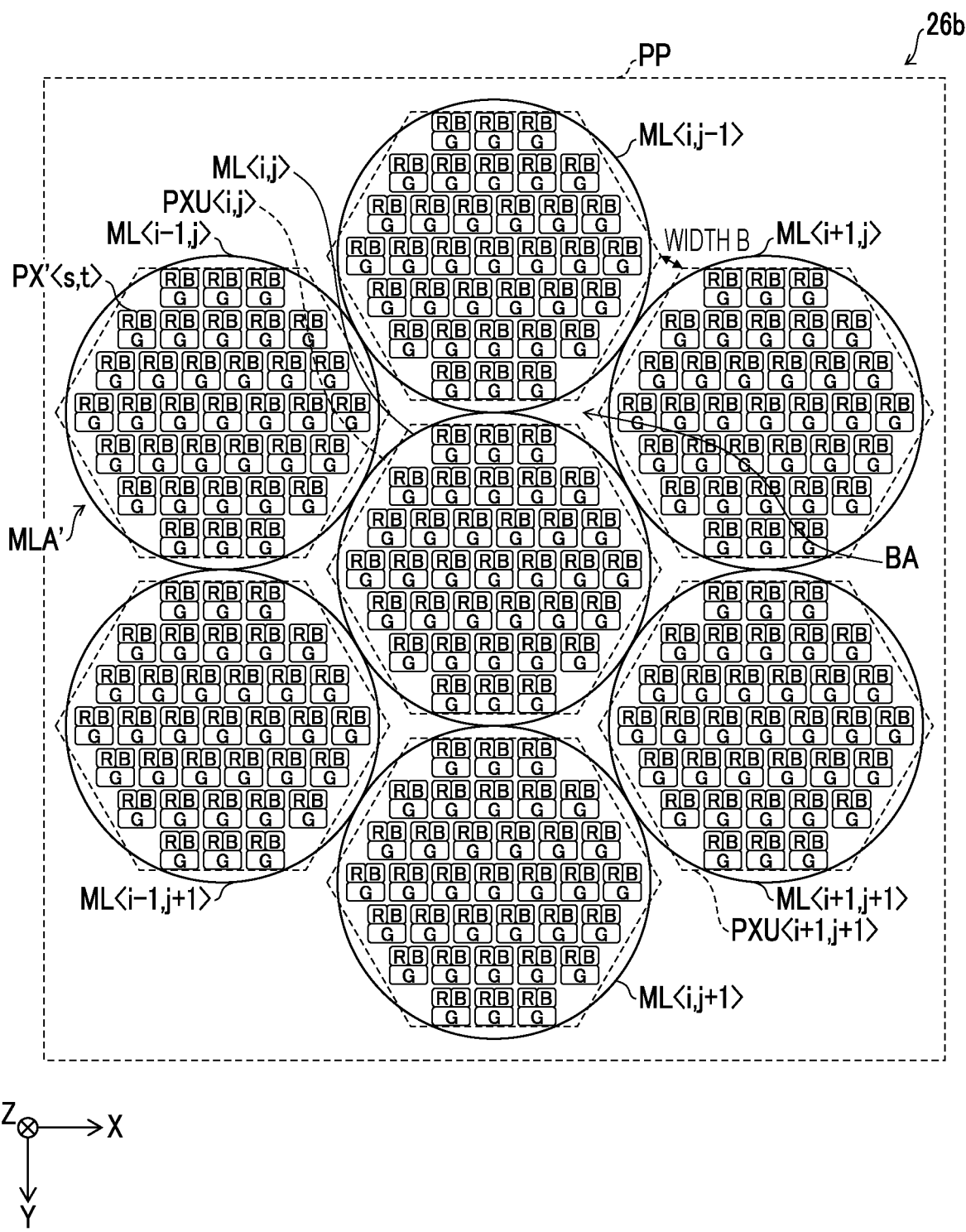
FIG. 9 is a plan view of a projected image of a three-dimensional display according to Embodiment 3 of the present disclosure.

FIG. 9 is a view schematically illustrating a configuration of the display unit 26b provided in the three-dimensional display according to Embodiment 3.

As illustrated in FIG. 9, in the display unit 26b, the micro-lens array MLA in which the plurality of micro-lenses ML<i, j> are disposed in a matrix as in Embodiment 2 is not used but a micro-lens array MLA' provided with the plurality of micro-lenses ML<i, j> shifted by a half pitch in the indirection in the figure every other column is used. The disposition pattern of a plurality of projected images PX'<s, t> corresponding to each of the micro-lenses ML<i, j> is different from the case of Embodiment 1 described above. Each projected image unit PXU<i, j> includes a group of a plurality of projected images PX'<s, t> corresponding to each of the micro-lenses ML<i, j>.

As illustrated in FIG. 9, in the micro-lens array MLA' provided in the display unit 26b, for example, a plurality of micro-lenses ML<i−1, j>, ML<i−1, j+1>, ML <i, j−1>, ML<i, j+1>, ML<i+1, j>, ML<i+1, j+1> may be disposed so as to surround the periphery of the micro-lens ML <i, j> disposed at the center, and may have a circular shape.

As such, in a case where the micro-lenses ML<i, j>, ML<i−1, j>, ML<i−1, j+1>, ML<i, j−1>, ML<i, j+1>, ML<i+1, j>, and ML<i+1, j+1> are disposed to form a circular shape, the micro-lenses ML<i, j> can be disposed at a higher density than in the case where the micro-lenses ML<i, j> are simply disposed in a matrix as in Embodiment 1 described above. Accordingly, the resolution of the three-dimensional dimensional image displayed on the display unit 26b cart be improved, and smoother three-dimensional representation can be realized.

As described above, in the micro-lens array MLA' provided in the display unit 26b, since the disposition pattern of the plurality of projected images PX'<s, t> corresponding to each of the micro-lenses ML<i, j> is different from the case of Embodiment 1, the disposition pattern of the pixels of the display element provided in the display unit 26b is also different.

The projected image PX'<s, t> is a projected image of a pixel on the display element by the projection optic PO<a, b>, that is, is obtained by projecting a display image displayed by the display element. The notation PX'<s, t> (s and t are natural numbers of 1 or more) is a notation for distinguishing a plurality of projected images.

As illustrated in FIG. 5, in each projected image unit PXU<i, j> including a group of the plurality of projected images PX'<s, t> corresponding to each micro-lens ML <i, j>, the number of projected images PX'<S, t> disposed in the X-direction in the figure is increased in the central region in the Y-direction in the figure, and the number of projected images PX'<s, t> disposed in the X-direction in the figure decreases as the distance from the central region in the Y-direction in the figure increases. Accordingly, the pixels on the display element provided in the display unit 26b also have the same disposition. This is because the possibility of actually using four corners of the 3D view region VR is low, so the 3D view region VR can be widened in the vicinity of the center of the projected image units PXU<i, j> in the Y-direction in the figure by reducing the number of pixels corresponding to the four corners portion and disposing pixels corresponding to the number of the reduced pixels in the central portion. As such, depending on how to make the 3D view region VR, it is possible to adjust the disposition of the projected image PX'<s, t>, that is, the disposition of the pixels on the display element.

It is desirable that a buffer area BA having a width B is provided between adjacent projected image units PXU<i, j> so that adjacent projected image units PXU<i, j> are not continuous with each other.

For example, in a liquid crystal display or the like, such disposition of pixels is difficult. In general, the pixels are defined by wiring disposed at the same pitch in the X-direction and the Y-direction, so it is difficult to dispose pixels with uneven pixel density. Even if the pixels are disposed unevenly due to complicated wiring, since the backlight emits light to the entire area, light in a part without pixels is wasted. On the other hand, in this embodiment, as compared with other displays such as liquid crystal displays, there is an advantage that the display unit 26b having a high density of the number of pixels, that is, the number of projected images PX'<s, t> can be realized as described above without wasting light.

Embodiment 4

Embodiment 4 of the present disclosure will be described below. Here, for convenience of explanation, the same reference symbols will be appended to members having the same functions as the members described in Embodiment 1, and the description thereof will not be repeated.

A configuration of a display element DE'<a, b> provided in a three-dimensional display according to Embodiment 4 is different from that of the display element DE<a, b> described in Embodiment 1.

Figure 10:
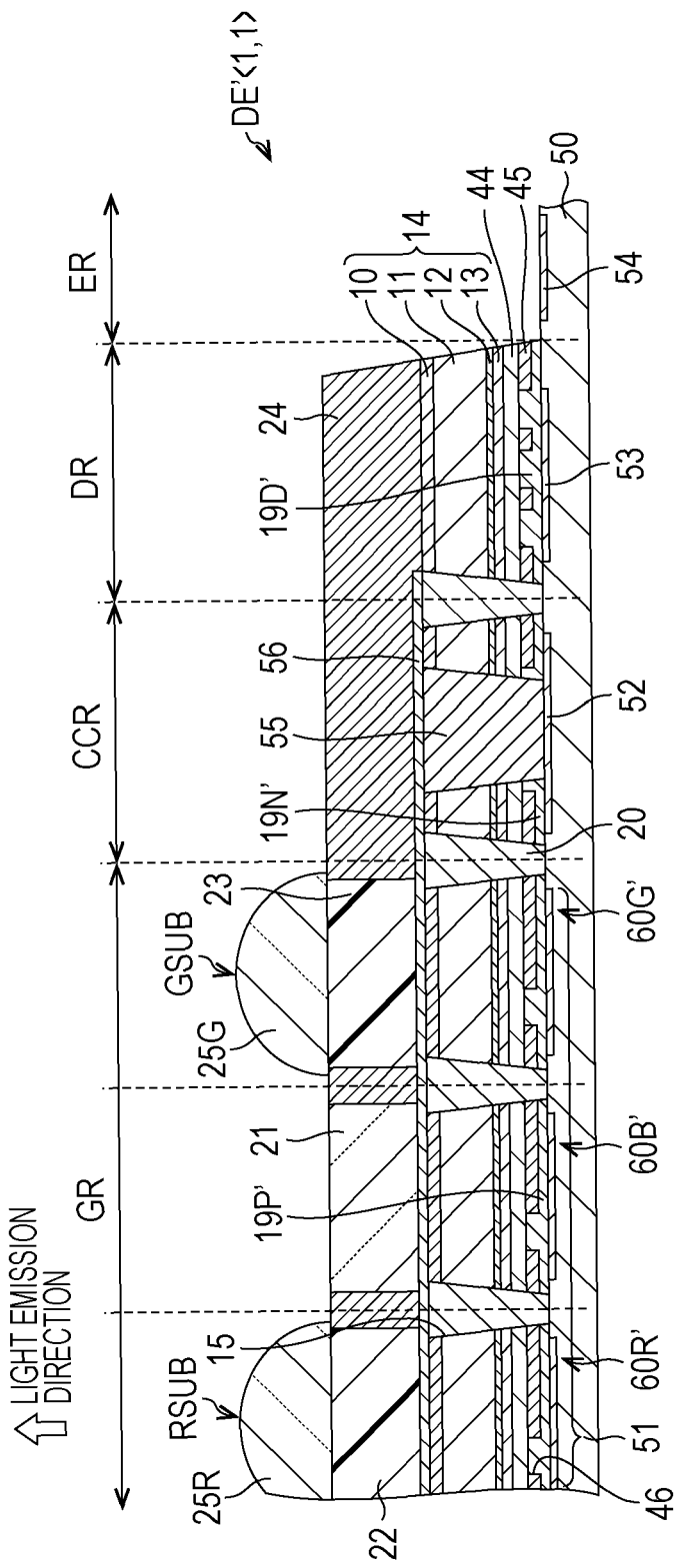
FIG. 10 is a sectional view of a display element provided in a display unit of a three-dimensional display according to Embodiment 4 of the present disclosure.

FIG. 10 is a view schematically illustrating a sectional view of a display element DE'<1, 1> provided in the three-dimensional display according Embodiment 4.

Each of the plurality of display elements DE'<a, b> provided in the three-dimensional display according to Embodiment 4, for example, the display element DE'<1, 1> differs from the display element DE<a, b> described in Embodiment 1 in that the display element DE'<1, 1> Includes micro-laser elements 60R', 60B', and 60G' of a vertical cavity surface emitting laser (VCSEL) type instead of the micro LED elements 60R, 60B, and 60G illustrated in FIGS. 6A and 6B, and in that the micro-lens 25R is provided on the red conversion portion 22 of the red sub-pixel RSUB, the micro-lens 25G is provided on the green conversion portion 23 of the green sub-pixel GSUB, and a micro-lens is not provided on the transparent portion 21 of the sub-pixel BSUB.

As illustrated in FIG. 10, since the display element DE'<1, 1> includes the micro-laser elements 60R', 60B', and 60G' of the VCSEL type which are light sources that emit blue light with high directivity, it is not demanded to dispose a micro-lens as a light convergence portion with respect to the blue light of the blue sub-pixel BSUB, which is emitted through the transparent portion 21. However, the red light generated by the wavelength conversion of the red conversion portion 22 of the red sub-pixel RSUB and the green light generated by the wavelength conversion of the green conversion portion 23 of the green sub-pixel GSUB have no directivity. Accordingly, similarly as in Embodiment 1 described above, it is desirable that the red sub-pixel RSUB and the green sub-pixel GSUB are provided with the micro-lenses 25R and 25G.

As illustrated in FIG. 10, the micro-laser elements 60R', 60B', and 60G' of the VCSEL type are significantly different from the micro LED elements 60R, 60B, and 60G illustrated in FIGS. 6A and 6B in that the micro-laser elements 60R', 60B', and 60G' have a first reflective layer 10 on the light-emitting side and a transparent electrode layer 44 and a second reflective layer 45 on the drive circuit substrate 50 side.

The first reflective layer 10 is a distributed Bragg reflector (DBR) that reflects blue light, and can be formed by stacking a plurality of pairs of an $Al_xGa_{(1-x)}N$ layer and a GaN layer. For example, the $Al_xGa_{(1-x)}N$ layer has a total of 36 layers, and the thickness of each layer is approximately 57 nm to 122 nm. 35 GaN layers are included between 36 $Al_xGa_{(1-x)}N$ layers, and the thickness of each GaN layer is approximately 53 nm to 114 nm. From the matters as described above, the total film thickness of the first reflective layer 10 used in this embodiment is approximately 5.2 nm, but is not limited thereto. Since the number of $Al_xGa_{(1-x)}N$ layers and the GaN layer can be appropriately determined, the total film thickness of the first reflective layer 10 can also be appropriately determined.

In this embodiment, a layer formed of indium tin oxide (ITO) and having a thickness of approximately 50 nm to 600 nm is used as the transparent electrode layer 44, but is not limited thereto, and if a transparent layer having conductivity can be formed, its thickness and material can be appropriately determined. In this embodiment, a film obtained by stacking 17 layers of $TiO_2$ thin films and $SiO_2$ thin films, which is a DBR including dielectric multilayer films, is used as the second reflective layer 45, and the film thickness is optimized for each layer in a range where the thickness of the $TiO_2$ thin film is 3 nm to 75 nm the film thickness of the $SiO_2$ thin film is 8 nm to 171 nm in the second reflective layer 45, but is not limited thereto. If the reflective layer can be formed, the thickness and material of the second reflective layer 45 can be appropriately determined.

As illustrated in FIG. 10, an opening 46 is formed in the second reflective layer 45. A P-electrode 19P' desirably has a plug portion which fills the opening 46, and the transparent electrode layer 44 is electrically connected to the P-electrode 19P' formed on the P-drive electrode 51 through the plug portion of the P-electrode 19P' filling the opening 46. An N-electrode 19N' provided in the common connection region CCR is the same as the N-electrode 19N illustrated in FIG. 6A except that the N-electrode 19N' has a plug portion filling the opening 46. A dummy P-electrode 19D' provided in the dummy region DR is the same as the dummy P-electrode 19D illustrated in FIG. 6B except that the dummy P-electrode 19D' has a plug portion filling the opening 46.

Even in a case where the configuration of the display element DE'<1, 1> illustrated in FIG. 10 is used, similarly as in the case of Embodiment 1 described above, it is possible to realize a three-dimensional display that displays brightly a three-dimensional image of such a size as to be placed on a palm with high accuracy and high resolution.

Embodiment 5

Embodiment 5 of the present disclosure will be described below. For convenience of explanation, the same reference symbols will be appended to members having the same functions as the members described in Embodiment 1, and the description thereof will not be repeated.

In a display element DE"<a, b> provided in the three-dimensional display according to Embodiment 5, a configuration of a buffer area BA" is different from the configuration of the buffer area BA' provided in the display element DE<a, b> described in Embodiment 1.

Figure 11:
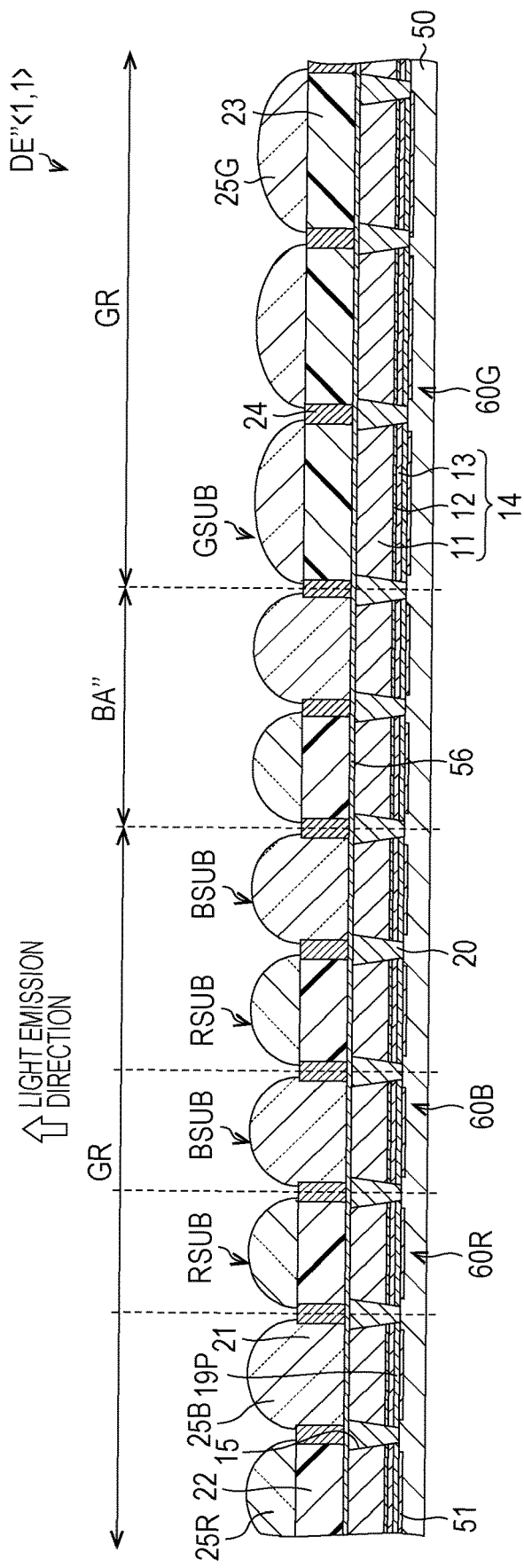
FIG. 11 is a sectional view of a display element provided in a display unit of a three-dimensional display according to Embodiment 5 of the present disclosure.

FIG. 11 is a view schematically illustrating a sectional view of a display element DE"<1, 1> provided in the three-dimensional display according to Embodiment 5.

Although the buffer area BA' provided in the display element DE<a, b> has a different structure from the pixel area GR provided in the display element DE <a, b> in the points that there is neither of wavelength conversion layer, transparent portion nor micro-lens as illustrated in FIG. 6A, the buffer area BA" provided in the display element DE"<a, b> has the same structure as the pixel area GR provided in the display element DE"<a, b> as illustrated in FIG. 11, However, since it is demanded to keep light from being emitted from the pixels provided in the buffer area BA" provided in the display element DE"<a, b>, the micro LEO elements 60R, 60G, and 60B provided in the buffer area BA" does not light up, that is, is in a non-light emission state.

There is an advantage that the projection area PA<a, b> can be set in correspondence with the micro-lens ML <i, j> after the display unit 26 is assembled by using the display element DE"<a, b> in which the buffer area BA" has the same structure as the pixel area GR. That is, in accordance with the projection area (projection area) PA<a, b> to be present, the corresponding pixel (corresponding micro LED element or corresponding micro laser element) that becomes the pixel region GR is selected and lit, and the corresponding pixel that becomes the buffer area BA" does not light up.

Control on such a corresponding pixel (corresponding micro element or corresponding micro laser element) can be performed by the drive circuit 27 (see FIG. 1). The drive circuit 27 may be provided on the drive circuit substrate 50 or may be provided on a part other than the drive circuit substrate 50.

In a case where the configuration of the display element DE"<1, 1> illustrated in FIG. 11 is used, similarly as in the case of Embodiment 1 described above, an advantage occurs that it is possible to realize a three-dimensional display that displays brightly a three-dimensional image of such a size as to be placed on the palm with high 3D-quality and high resolution, it is not demanded to perform positional alignment of the micro-lens array MLA and the micro-projectors MP<a, b> with high accuracy, and the cost demanded for assembling the display unit 26 can be significantly reduced.

Embodiment 6

Embodiment 6 of the present disclosure will be described below. For convenience of explanation, the same reference symbols are appended to members having the same functions as the members described in Embodiments 1 to 5, and the description thereof will not be repeated.

A three-dimensional display (aerial three-dimensional display) 70 that displays a three-dimensional image (floating aerial three-dimensional image 42) floating in the air according to Embodiment 6 includes the three-dimensional display according to any one of Embodiments 1 to 5 described above, and a reflective optical element 41. In this embodiment, a case where the three-dimensional display 70 includes the three-dimensional display 31 including the display unit 26 described Embodiment 1 will be described as an example.

Figure 12:
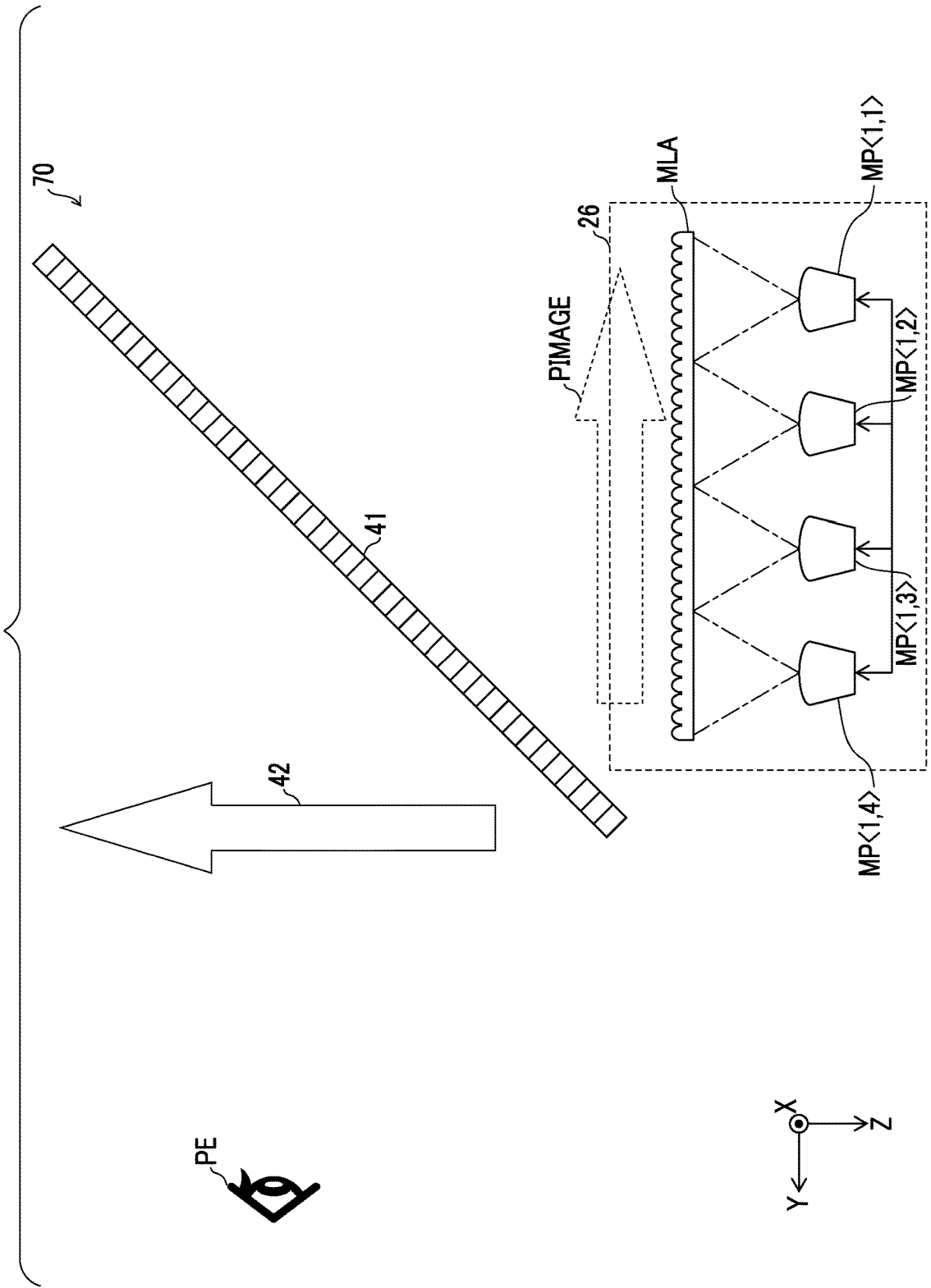
FIG. 12 is a view schematically illustrating a configuration of a three-dimensional display that displays a three-dimensional image floating in the air according to Embodiment 6 of the present disclosure.

FIG. 12 is a view schematically illustrating a configuration of the three-dimensional display 70. As illustrated in FIG. 12, the three-dimensional display 70 includes the three-dimensional display 31 including the display unit 26 and the reflective optical element 41.

The reflective optical element 41 is an optical member that, displays a three-dimensional image PI MAGE generated by the three-dimensional display 31 including the display unit 26 in the air. In this embodiment, a dihedral corner reflector array (DCPA) is used as the reflective optical element 41.

The three-dimensional display 70 includes, for example, the display unit 26 disposed in parallel to a horizontal plane (X-Y plane), and the reflective optical element 41 disposed so as to be inclined at approximately 45 degrees with respect to the display unit 26. The three-dimensional display 31 including the display unit 26 and the reflective optical element 41 extend in a plane shape in the direction (X-direction) perpendicular to the paper surface of FIG. 12, and the three-dimensional image PIMAGE formed by the three-dimensional display 31 is displayed as the floating aerial three-dimensional image 42 in the air by the reflective optical element 41. The floating aerial three-dimensional image 42 is displayed in a spread on the X-Z plane.

In the three-dimensional display 70, the observer PE can view the floating aerial three-dimensional image 42 formed in the air by the reflective optical element 41 by viewing from the horizontal direction. The three-dimensional display 70 is configured such that the observer PE can visually recognize the floating aerial three-dimensional image 42 when Viewed from any direction in the 3D view region VR.
Characteristic of Three-Dimensional Display That Displays Three-Dimensional Image Which Floats in the Air The inventor performs evaluation on a three-dimensional display that displays a three-dimensional image floating in the air and including the three-dimensional display (configuration in which the number of the micro-lenses ML<i, j> is 600×400, and the number of projected images PX<S, t> per each micro-lens ML<i, j> is 36) described in the section (regarding characteristics of three-dimensional display) in Embodiment 1 described above and the reflective optical element 41. Luminance measurement was performed by the method already described in Embodiment 1 except that the luminance of the reflective optical element 41 was measured at a distance of 1 m from the reflective optical element 41. In accordance with this evaluation, the luminance of the three-dimensional display that displays the three-dimensional image floating in the air is 619 Cd/m$^2$, which is approximately 43% darker than the result of the three-dimensional display in Embodiment 1. However, the luminance comparable to that of a normal indoor flat display could be realized without difficulty. The decrease in luminance in the three-dimensional display that displays the three-dimensional image floating in the air is mainly due to reflection loss by the reflective optical element 41. This can be improved by increasing the aperture ratio of the reflective optical element 41.

Embodiment 7

Embodiment 7 of the present disclosure will be described below. For convenience of explanation, the same reference symbols are appended to members having the same functions as the members described in the Embodiment 6, and the description will not be repeated.

A three-dimensional display (aerial three-dimensional display) 70a displaying a three-dimensional image (floating aerial three-dimensional image 42a) floating in the air according to Embodiment 7 differs from the three-dimensional display 70 described in Embodiment 6 in that the three-dimensional display 70a includes the three-dimensional display according to any one of Embodiment 1 to 5 described above, a half mirror 81, and a retroreflective film 82, and includes the half mirror 81 and the retroreflective film 82 instead of the reflective optical element 41. In this embodiment, a case where the three-dimensional display 70a includes the three-dimensional display 31 including the display unit 26 described in Embodiment 1 will be described as an example.

Figure 13:
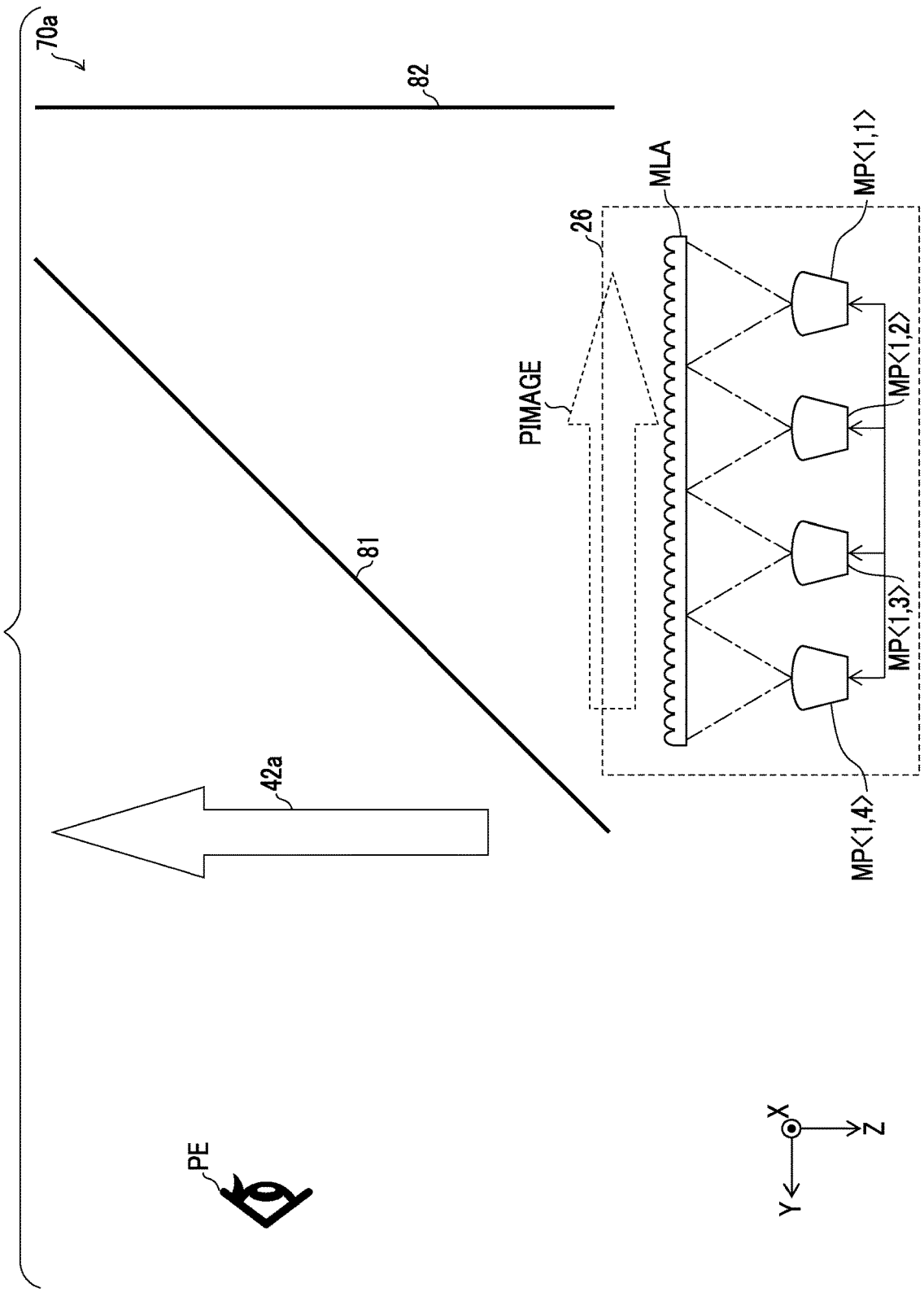
FIG. 13 is a view schematically illustrating a configuration of a three-dimensional display that displays a three-dimensional image floating in the air according to Embodiment 7 of the present disclosure.

FIG. 13 is a view schematically illustrating a configuration of the three-dimensional display 70a. As illustrated in FIG. 13, the three-dimensional display 70a includes the three-dimensional display 31 including the display unit 26, the half mirror 81, and the retroreflective film 82.

The half mirror 81 and the retroreflective film 82 are optical members for displaying the three-dimensional image PIMAGE generated by the three-dimensional display 31 including the display unit 26 in the air.

The three-dimensional display 70a includes, for example, the display unit 26 disposed parallel to a horizontal plane (X-Y plane) and the half mirror 81 disposed so as to be inclined at approximately 45 degrees with respect to the display unit 26. The three-dimensional display 70a includes the retroreflective film 82 disposed parallel to the X-Z plane perpendicular to the horizontal plane. The half mirror 81 and the retroreflective film 82 are disposed in a light emission direction of the three-dimensional display 70a with respect to the three-dimensional display 70a. The three-dimensional display 31 including the display unit 26, the half mirror 81, and the retroreflective film 82 extend in a plane shape in the direction perpendicular to the paper surface of FIG. 13 (X-direction).

The light forming the three-dimensional image PIMAGE generated by the three-dimensional display 31 including the display unit 26 is reflected by the half mirror 81 at a reflection angle equal to the incident angle, and is incident on the retroreflective film 82. The retroreflective film 82 reflects incident light in an incidence direction. With this configuration, the three-dimensional image PIMAGE generated by the three-dimensional display 31 including the display unit 26 is formed on the back side of the half mirror 61 when viewed from the retroreflective film 62 side.

The observer PE can visually observe a floating aerial three-dimensional image 42a formed by the three-dimensional display 70a from the horizontal direction. The floating aerial three-dimensional image 42a is displayed so as to spread on the X-Z plane, and the observer PE can visually recognize the floating aerial three-dimensional image 42a formed by the three-dimensional display 70a as a three-dimensional image when viewed from any direction in the 3D view region VR.

Embodiment 8

Embodiment 8 of the present disclosure will be described below. For convenience of explanation, the same reference symbols are appended to members having the same functions as the members described in Embodiments 1 to 7, and the description thereof will not be repeated.

A three-dimensional display (aerial three-dimensional display) 70b displaying a three-dimensional image (floating aerial three-dimensional image 42b) floating in the air according to Embodiment 6 is different from Embodiments 1 to 7 described above in that the three-dimensional display (aerial three-dimensional display) 70b is a three-dimensional display that does not use the micro-lens array MLA.

Figure 14:
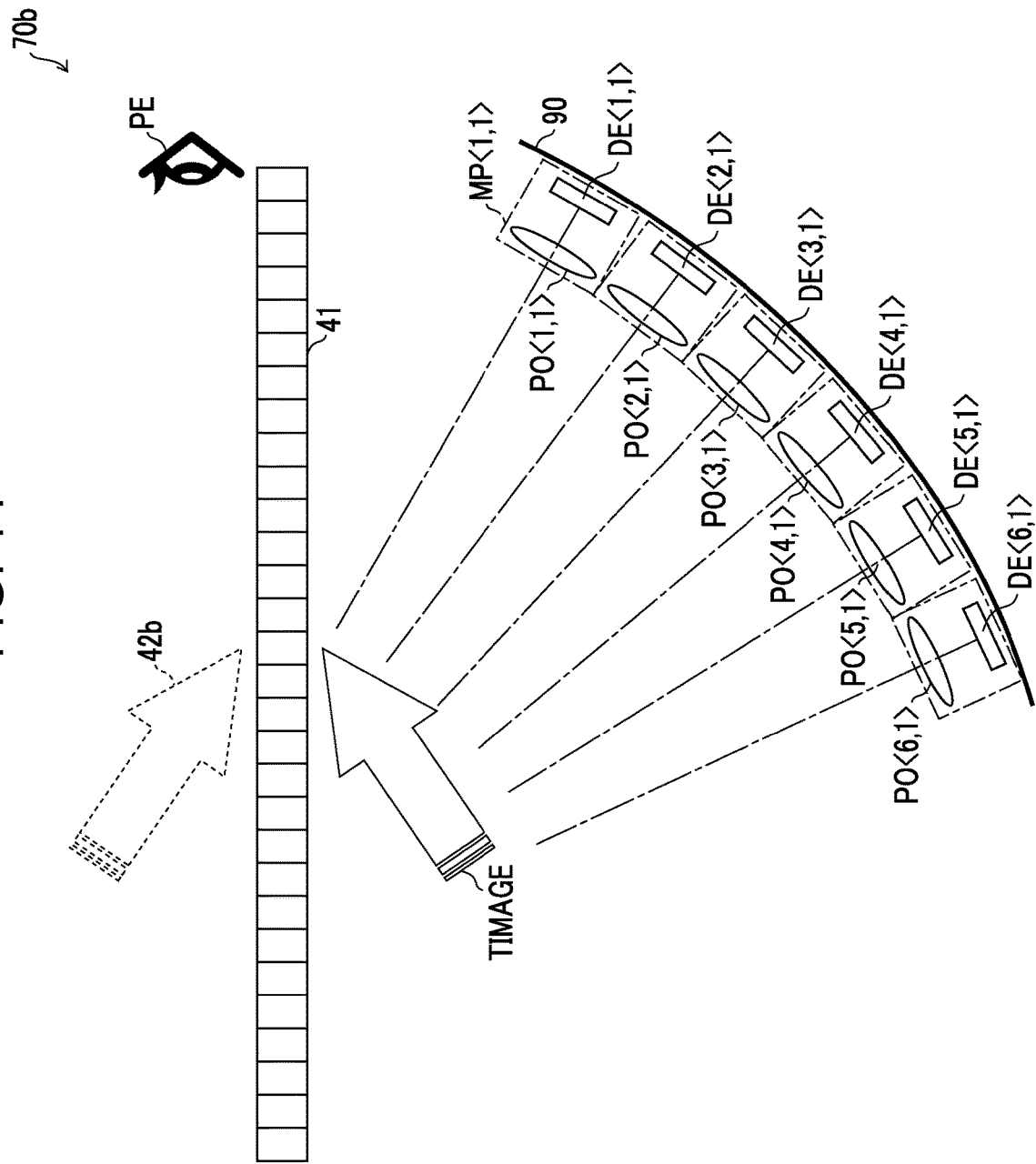
FIG. 14 is a view schematically illustrating a configuration of a three-dimensional display that displays a three-dimensional image floating in the air according to Embodiment 8 of the present disclosure.

FIG. 14 is a view schematically illustrating the configuration of the three-dimensional display 70b.

As illustrated in FIG. 14, micro-projectors MP<1, 1> to MP<6, 1> are formed on a substrate (curved substrate) 90 which has a curved surface shape and forms a part of a spherical surface, and optical axes of the micro-projectors MP<1, 1> to MP<6, 1> are directed to the center of curvature of the substrate (curved substrate) having a curved surface shape and forming a part of the spherical surface. The micro-projectors MP<a, b> are also disposed in the direction perpendicular to the paper surface of FIG. 14 and are disposed in a two-dimensional array on the substrate (curved substrate) 90, and the optical axes of all the micro-projectors MP<a, b> are directed to the center of curvature. In FIG. 14, an arrangement of six micro-projectors which are a part of the micro-projectors MP<a, b> disposed in a two-dimensional array is exemplified. The number of micro-projectors MP<a, b> disposed in a two-dimensional array on the substrate (curved substrate) 90 can be appropriately selected in accordance with the 3D-quality of the floating aerial three-dimensional image 42b as described later. The micro-projectors MP<1, 1> to MP<6, 1> place the object at the center of the sphere described above and project an image of the object captured from its installation position. Accordingly, a projected image TIMAGE is a superimposed image of the images when viewed from different angles of the object projected by each of the micro-projectors MP<1, 1> to MP<6, 1>. The projected image TIMAGE is displayed as the floating aerial three-dimensional image 42b by the reflective optical element (DCRA) 41 disposed above, and is observed as a three-dimensional image floating above the reflective optical element (DCRA) 41 from the observer PE. In the three-dimensional display 70b, the resolution of the floating aerial three-dimensional image 42b is equal to the resolution of the projected image TIMAGE. Accordingly, it is equal to a value obtained by multiplying the resolution of the display elements DE<1, 1> to DE<6, 1> by the magnification by the projection optics PO<1, 1> to PO<6, 1>. The 3D-quality of the floating aerial three-dimensional image 42b is determined by the number of micro-projectors MP<a, b> disposed on the substrate (curved substrate) 90 having a curved surface shape and forming a part of the spherical surface. By increasing the number of micro-projectors MP<a, b> and superimposing the images of the objects viewed from many different angles, it is possible to improve the 3D-quality of the floating aerial three-dimensional image 42b.

In the conventional integral imaging technique, it is demanded to make the micro-lens smaller in order to improve the resolution. Accordingly, if the micro-lens is made small to increase the resolution, lens accuracy of the micro-lens is reduced, in order to improve the 3D-quality of the three-dimensional image, although there is a problem that it is demanded to make the pixels smaller and the three-dimensional image becomes dark, such a problem does not occur in the three-dimensional display 70b.

Figure 15:
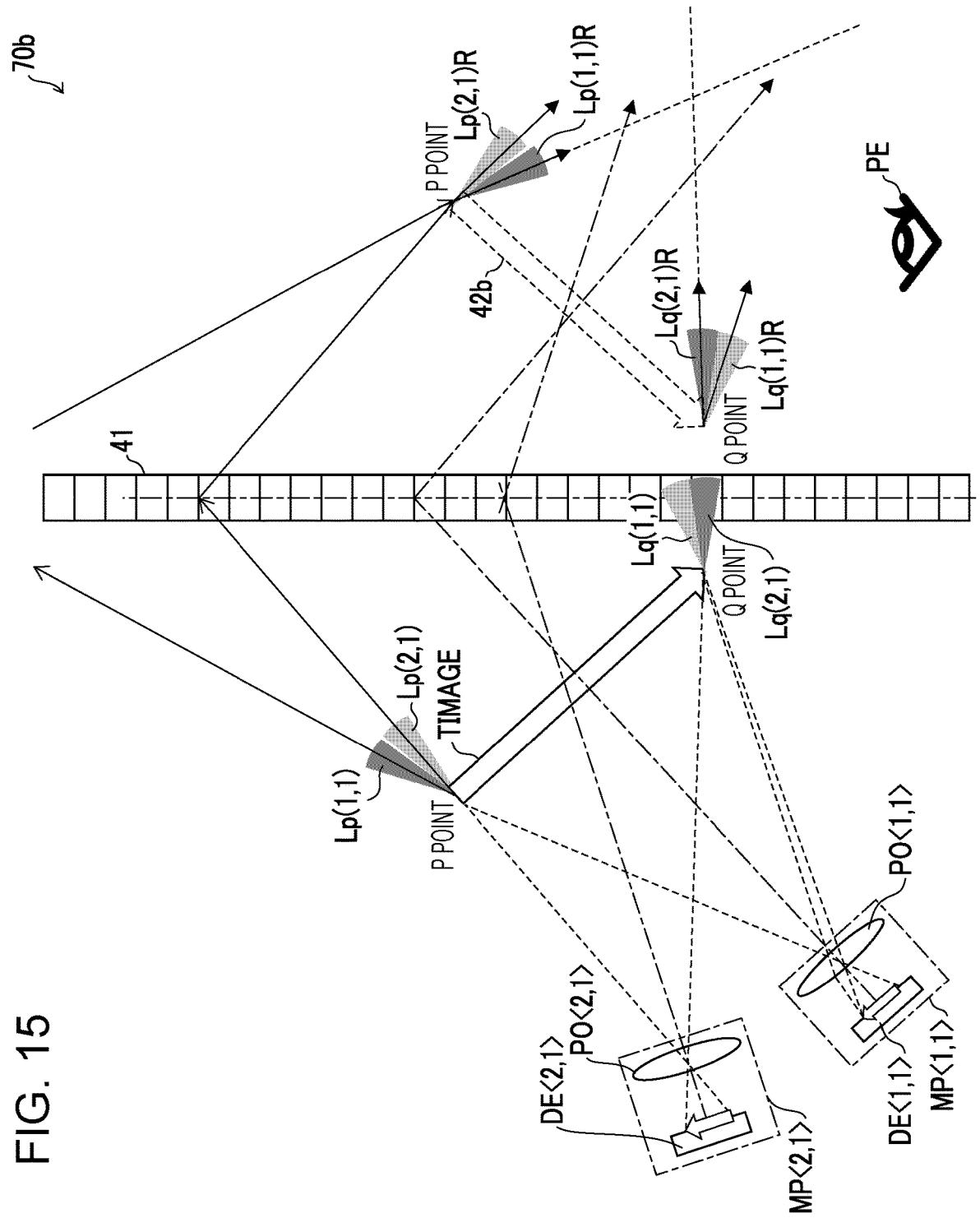
FIG. 15 is an enlarged view illustrating a part of the three-dimensional display that, displays the three-dimensional image floating in the air according to Embodiment 8 of the present disclosure.

FIG. 15 is a view illustrating a part of the three-dimensional display 70b illustrated in FIG. 14, and illustrates optical paths of the projected image TIMAGE from the micro-projector HP<a, b> and the floating aerial three-dimensional image 42b.

In FIG. 15, in order to simplify the explanation, the substrate (curved substrate) 90 having a curved surface shape and forming a part of a spherical surface is not illustrated, and only two micro-projectors MP<1, 1> to MP<2, 1> with different angles are illustrated and the two micro-projectors MP<1, 1> to MP<2, 1> will be described.

Light emitted from the micro-projector MP<2, 1> and formed an image at a point Q of the projected image TIMAGE is incident on the reflective optical element (DCRA) 41 as Lq(2, 1), is reflected by the DCRA 41, and travels as Lq(2, 1)R. It appears to the observer PE that light is emitted from point Q of the floating aerial three-dimensional image 42b. Light emitted from the micro-projector MP<1,1> at different angles and formed an image at the Q point of the projected image TIMAGE is incident on the reflective optical element (DCRA) 41 as Lq(1, 1), is reflected by the DCRA 41, and travels as Lq(1, 1)R. The central axes of Lq (1, 1) and Lq (2, 1) are offset from each other by the same as the angle difference between the optical axes of micro-projector MP<1, 1> and micro-projector MP<2, 1>. Similarly, the traveling directions of Lq(1, 1)R and Lq(2, 1)R are offset from each other by the same as the angle difference between the optical axes of micro-projector MP<1, 1> and micro-projector MP<2, 1>. Therefore, depending on the position of the eye of the observer PE, matters that one can be seen and the other may not be seen may occur. In this way, for the observer PE, the floating aerial three-dimensional image 42b floating in the air is observed. The relationship between Lp(2, 1) and Lp(1, 1) and Lp(2, 1)R and Lp(1, 1)R is the same, and as for the point P, as in the case of the point Q, a three-dimensional image can be recognized by viewing different images depending on the viewing direction of the observer PE.

If the three-dimensional display 70b illustrated in FIGS. 14 and 15 is configured not by the micro-projector MP<a, b> but by a normal projector, the three-dimensional display has a very large configuration, becomes a very expensive device, and has utility value only for special applications. Therefore, in this embodiment, the three-dimensional display 70b illustrated in FIGS. 14 and 15 is configured by the micro-projectors MP<a, b>. The micro-projectors HP<a, b> have a size of several centimeters, and it is possible to manufacture a compact high resolution three-dimensional display. In addition, since the manufacturing cost is also lower by an order of magnitude than that of a normal projector, it is possible to manufacture a highly accurate three-dimensional image display by several to dozens of micro-projectors MP<a, b>.

SUMMARIZATION

A three-dimensional display according to an aspect 1 of the present disclosure includes a plurality of micro-projectors and an optical member, and in which each of the plurality of micro-projectors includes a display element and a projection optic for projecting a display image displayed by the display element toward the optical member, and the display element includes a drive circuit substrate and a plurality of micro light emission elements formed on a surface on one side of the drive circuit substrate.

In the aspect 1, in the three-dimensional display according to an aspect 2 of the present disclosure, a light convergence portion is provided on at least some of the plurality of micro light emission elements.

In the aspect 1 or 2, in the three-dimensional display according to an aspect 3 of the present disclosure, a plurality of pixel regions in which the plurality of micro light emission elements are disposed are separated from each other by a buffer area that does not emit light.

In the aspect 3, in the three-dimensional display according to an aspect 4 of the present disclosure, a dummy element that does not emit light is disposed in the buffer area, and the dummy element that does not emit light has an identical physical structure to the micro light emission elements disposed in the pixel regions.

In the aspect 3, in the three-dimensional display according to an aspect 5 of the present disclosure, a micro light emission element of the micro light emission elements having an identical structure to the micro light emission elements disposed in the pixel regions is disposed in the buffer area, and the micro light emission element in the buffer area is controlled no to emit light.

In any one of the aspects 1 to 5, in the three-dimensional display according to an aspect 6 of the present disclosure, a plurality of pixels forming the display image are disposed in a plurality of pixel regions in which the plurality of micro light emission elements are disposed and each of the pixels includes a red sub-pixel, a blue sub-pixel, and a green sub-pixel, and each of the red sub-pixel, the blue sub-pixel, and the green sub-pixel includes at least one micro light emission element of the micro light emission elements.

In the aspect 6, in the three-dimensional display according to an aspect 7 of the present disclosure, the at least one micro light emission element included in the blue sub-pixel includes a nitride semiconductor layer, and the blue sub-pixel outputs blue light from the nitride semiconductor layer.

In the aspect 6 or 7, in the three-dimensional display according to an aspect 8 of the present disclosure, the at least one micro light emission element included in the red sub-pixel includes a nitride semiconductor layer, a first wavelength conversion layer is provided on the at least one micro light emission element, included in the red sub-pixel, and the red sub-pixel converts the blue light from the nitride semiconductor layer into red light by the first wavelength conversion layer and outputs the red light.

In any one of the aspects 6 to 8, in the three-dimensional display according to an aspect 9 of the present disclosure, the at least one micro light emission element included in the green sub-pixel includes a nitride semiconductor layer, a second wavelength conversion layer is provided on the at least one micro light emission element included in the green sub-pixel, and the green sub-pixel converts the blue light from the nitride semiconductor layer into green light by the second wavelength conversion layer and outputs the green light.

In any one of the aspects 1 to 9, in the three-dimensional display according to an aspect 10 of the present disclosure, a magnification of the display image by the projection optic of each of the micro-projectors is 1 time or more.

In any one of the aspects 1 to 10, in the three-dimensional display according to an aspect 11 of the present disclosure, an optical aperture of the projection optic is larger than a size of the display image.

In any one of the aspects 1 to 11, in the three-dimensional display according to an aspect 12 of the present disclosure, the optical member is a micro-lens array having a plurality of micro-lenses.

In the aspect 12, in the three-dimensional display according to an aspect 13 of the present disclosure, an image to be displayed by N (N is a natural number more than 1) pixels in a pixel region (pixel region) which is a region forming the display image of the display element is projected on each of the micro-lenses provided in the micro-lens array, and the micro-lens array has luminance greater than $(1000/N)cd/m^2$.

In the aspect 12 or 13, in the three-dimensional display according to an aspect 14 of the present disclosure, a shielding wall that separates a boundary of the micro-lenses is provided between the micro-lens array and a projection plane formed by the projection optic of each of the plurality of micro-projectors by projecting the display image, and the shielding wall is a material including a light absorbing material.

In any one of the aspects 1 to 14, the three-dimensional display according to an aspect 15 of the present disclosure further includes a reflective optical element for displaying a three-dimensional image generated by the three-dimensional display in air.

In any one of the aspects 1 to 11, in the three-dimensional display according to an aspect 16 of the present disclosure, each of the plurality of micro-projectors is disposed on a curved substrate, an optical axis of each of the plurality of micro-projectors disposed on the curved substrate is directed to the center of curvature of the curved substrate, and the optical member is a reflective optical element for displaying a three-dimensional image generated by each of the plurality of micro-projectors in air.

The present disclosure is not limited to the respective embodiments described above, and various modifications may be made thereto within the scope set forth in the claims, and embodiments obtained by appropriately combining technical means respectively disclosed in different embodiments are also included in the technical scope of the present disclosure. Furthermore, new technical features can be formed by combining technical means disclosed in the respective embodiments.

The present disclosure contains subject matter related to that disclosed in Japanese Priority Patent Application JP 2018-096497 filed in the Japan Patent Office on May 18, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional display comprising:
a plurality of micro-projectors; and
an optical member,
wherein each of the plurality of micro-projectors includes a display element and a projection optic for projecting a display image displayed by the display element toward the optical member,
the display element includes a drive circuit substrate and a plurality of micro light emission elements formed on a surface on one side of the drive circuit substrate,
a plurality of pixel regions in which the plurality of micro light emission elements are disposed are separated from each other by a buffer area that does not emit light, and
a dummy element that does not emit light is disposed in the buffer area, and the dummy element that is not capable of emitting light has an identical physical structure to the micro light emission elements disposed in the pixel regions.

2. The three-dimensional display according to claim 1, wherein a light convergence portion is provided on at least some of the plurality of micro light emission elements.

3. The three-dimensional display according to claim 1, wherein a plurality of pixels forming the display image are disposed in a plurality of pixel regions in which the plurality of micro light emission elements are disposed and each of the pixels includes a red sub-pixel, a blue sub-pixel, and a green sub-pixel, and
each of the red sub-pixel, the blue sub-pixel, and the green sub-pixel includes at least one micro light emission element of the micro light emission elements.

4. The three-dimensional display according to claim 3, wherein the at least one micro light emission element included in the blue sub-pixel includes a nitride semiconductor layer, and
the blue sub-pixel outputs blue light from the nitride semiconductor layer.

5. The three-dimensional display according to claim 3, wherein the at least one micro light emission element included in the red sub-pixel includes a nitride semiconductor layer,
a first wavelength conversion layer is provided on the at least one micro light emission element included in the red sub-pixel, and
the red sub-pixel converts blue light from the nitride semiconductor layer into red light by the first wavelength conversion layer and outputs the red light.

6. The three-dimensional display according to claim 3, wherein the at least one micro light emission element included in the green sub-pixel includes a nitride semiconductor layer,
a second wavelength conversion layer is provided on the at least one micro light emission element included in the green sub-pixel, and
the green sub-pixel converts blue light from the nitride semiconductor layer into green light by the second wavelength conversion layer and outputs the green light.

7. The three-dimensional display according to claim 1, wherein a magnification of the display image by the projection optic of each of the micro-projectors is 1 time or more.

8. The three-dimensional display according to claim 1, wherein an optical aperture of the projection optic is larger than a size of the display image.

9. The three-dimensional display according to claim 1, wherein the optical member is a micro-lens array having a plurality of micro-lenses.

10. The three-dimensional display according to claim 1, further comprising:
a reflective optical element for displaying a three-dimensional image generated by the three-dimensional display in air.

11. The three-dimensional display according to claim 1, wherein each of the plurality of micro-projectors is disposed on a curved substrate,
an optical axis of each of the plurality of micro-projectors disposed on the curved substrate is directed to a center of curvature of the curved substrate, and
the optical member is a reflective optical element for displaying a three-dimensional image generated by each of the plurality of micro-projectors in air.

12. A three-dimensional display comprising:
a plurality of micro-projectors; and
an optical member,
wherein each of the plurality of micro-projectors includes a display element and a projection optic for projecting a display image displayed by the display element toward the optical member,
the display element includes a drive circuit substrate and a plurality of micro light emission elements formed on a surface on one side of the drive circuit substrate,
the optical member is a micro-lens array having a plurality of micro-lenses,
an image to be displayed by N (N is a natural number more than 1) pixels in a pixel region which is a region forming the display image of the display element is projected on each of the micro-lenses provided in the micro-lens array, and
the micro-lens array has luminance greater than $(1000/N)\text{cd/m}^2$.

13. The three-dimensional display according to claim 12, wherein each of the plurality of micro-projectors is disposed on a curved substrate,
an optical axis of each of the plurality of micro-projectors disposed on the curved substrate is directed to a center of curvature of the curved substrate, and
the optical member is a reflective optical element for displaying a three-dimensional image generated by each of the plurality of micro-projectors in air.

14. The three-dimensional display according to claim 12, further comprising:
a reflective optical element for displaying a three-dimensional image generated by the three-dimensional display in air.

15. A three-dimensional display comprising:
a plurality of micro-projectors; and
an optical member,
wherein each of the plurality of micro-projectors includes a display element and a projection optic for projecting a display image displayed by the display element toward the optical member,
the display element includes a drive circuit substrate and a plurality of micro light emission elements formed on a surface on one side of the drive circuit substrate,
the optical member is a micro-lens array having a plurality of micro-lenses,
a shielding wall that separates a boundary of the micro-lenses is provided between the micro-lens array and a projection plane formed by the projection optic of each of the plurality of micro-projectors by projecting the display image, and the shielding wall is a material including a light absorbing material.

16. The three-dimensional display according to claim 15, further comprising:

a reflective optical element for displaying a three-dimensional image generated by the three-dimensional display in air.

17. The three-dimensional display according to claim 15, wherein each of the plurality of micro-projectors is disposed on a curved substrate, an optical axis of each of the plurality of micro-projectors disposed on the curved substrate is directed to a center of curvature of the curved substrate, and the optical member is a reflective optical element for displaying a three-dimensional image generated by each of the plurality of micro-projectors in air.

* * * * *